United States Patent
Amano et al.

(10) Patent No.: US 9,528,846 B2
(45) Date of Patent: Dec. 27, 2016

(54) MAP INFORMATION CREATION DEVICE, INFORMATION PRESENTATION DEVICE, MAP INFORMATION CREATION METHOD AND INFORMATION PROVISION METHOD

(71) Applicant: Panasonic Intellectual Property Management Co., Ltd., Osaka (JP)

(72) Inventors: Hiroshi Amano, Osaka (JP); Takashi Akita, Hyogo (JP); Akira Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/771,931

(22) PCT Filed: Mar. 14, 2014

(86) PCT No.: PCT/JP2014/001459
§ 371 (c)(1),
(2) Date: Sep. 1, 2015

(87) PCT Pub. No.: WO2014/148021
PCT Pub. Date: Sep. 25, 2014

(65) Prior Publication Data
US 2016/0011002 A1   Jan. 14, 2016

(30) Foreign Application Priority Data
Mar. 18, 2013   (JP) .................................. 2013-055574

(51) Int. Cl.
*G01C 21/36* (2006.01)
*H04W 4/04* (2009.01)
(Continued)

(52) U.S. Cl.
CPC ........... *G01C 21/3655* (2013.01); *G01C 21/32* (2013.01); *G01C 21/362* (2013.01);
(Continued)

(58) Field of Classification Search
CPC ... G01C 21/3655; G01C 21/362; G01C 21/32; H04B 1/3822; H04W 4/046; G08G 1/0112; G08G 1/0141; G08G 1/0129; G09B 29/00; G09B 29/10
(Continued)

(56) References Cited

U.S. PATENT DOCUMENTS 7,038,596 B2   5/2006   Nakajima
7,477,990 B2   1/2009   Iwami et al.
(Continued)

FOREIGN PATENT DOCUMENTS

| JP | 2003-28659 | 1/2003 |
|---|---|---|
| JP | 2004-70795 | 3/2004 |

(Continued)

OTHER PUBLICATIONS

Extended European Search Report issued Mar. 18, 2016 in corresponding European Application No. 14767869.2.
(Continued)

*Primary Examiner* — Brian P Sweeney
(74) *Attorney, Agent, or Firm* — Wenderoth, Lind & Ponack, L.L.P.

(57) ABSTRACT

A map information creation device for presenting information at an appropriate time includes: an operation obtaining unit which obtains operation information indicating (i) each of positions passed through by a movable body that is moved by a user and (ii) a frequency of an operation performed on a device by a user of the movable body when the movable body is at the position; a determining unit which determines, for each of positions on a map, whether or not information
(Continued)

presentation is allowed, based on the frequency at the position indicated by the operation information; and a creating unit which creates the map information indicating a result of the determination by the determining unit for each position on the map.

11 Claims, 37 Drawing Sheets

(51) Int. Cl.
    *H04B 1/3822*     (2015.01)
    *G09B 29/00*     (2006.01)
    *G09B 29/10*     (2006.01)
    *G01C 21/32*     (2006.01)
    *G08G 1/01*     (2006.01)

(52) U.S. Cl.
    CPC ......... *G08G 1/0112* (2013.01); *G08G 1/0129* (2013.01); *G08G 1/0141* (2013.01); *G09B 29/00* (2013.01); *G09B 29/10* (2013.01); *H04B 1/3822* (2013.01); *H04W 4/046* (2013.01)

(58) Field of Classification Search
    USPC .......................................................... 701/516
    See application file for complete search history.

(56) References Cited

U.S. PATENT DOCUMENTS

2004/0239526 A1   12/2004   Nakajima
2004/0252027 A1   12/2004   Torkkola et al.
2007/0021910 A1    1/2007   Iwami et al.

FOREIGN PATENT DOCUMENTS

| JP | 2004-348657 | | 12/2004 | |
| JP | 2008-204017 | | 9/2008 | |
| JP | 2010-237954 | | 10/2010 | |
| JP | 2010-0237954 A | * | 10/2010 | ............ G01C 21/00 |
| WO | 2005/017458 | | 2/2005 | |

OTHER PUBLICATIONS

International Search Report issued Jun. 24, 2014 in corresponding International Application No. PCT/JP2014/001459 (with English translation).

* cited by examiner

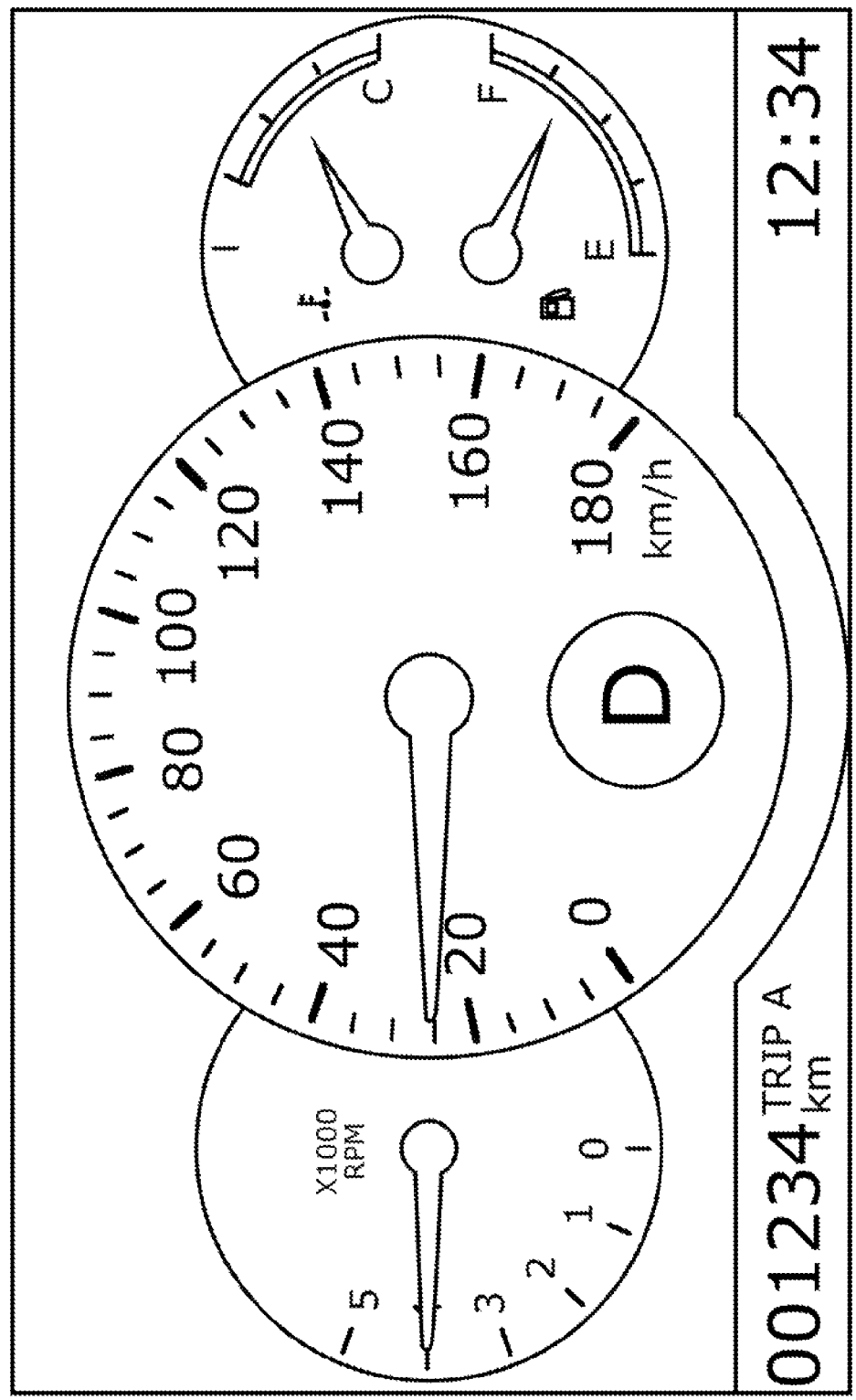

| Position | | Number of times |
| Latitude | Longitude | of operations |
|---|---|---|
| 135.577 | 34.756 | 2511 |
| 135.577 | 34.7559 | 325 |
| 135.576 | 34.7558 | 125 |
| 135.576 | 34.7557 | 0 |
| 135.576 | 34.7556 | 0 |
| 135.576 | 34.7555 | 0 |
| 135.576 | 34.7554 | 0 |
| ... | ... | ... |

Operation information d1

| Position | | Identification information indicating whether information presentation is allowed |
|---|---|---|
| Latitude | Longitude | |
| 135.577 | 34.756 | Allowed |
| 135.577 | 34.7559 | Allowed |
| 135.576 | 34.7558 | Allowed |
| 135.576 | 34.7557 | Prohibited |
| 135.576 | 34.7556 | Prohibited |
| 135.576 | 34.7555 | Prohibited |
| 135.576 | 34.7554 | Prohibited |
| ... | ... | ... |

Map information d2

FIG. 10B
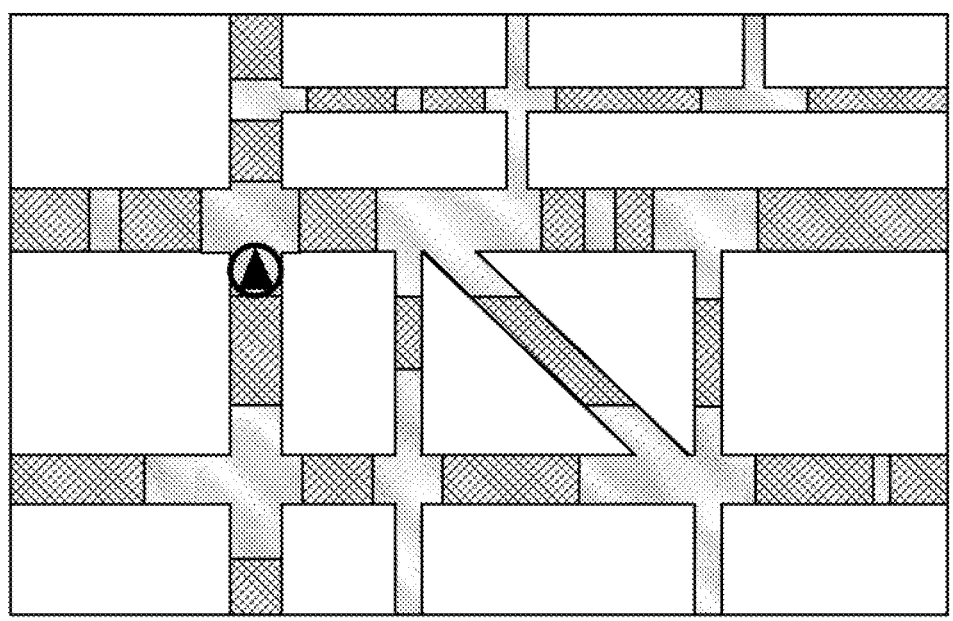
 Information presentation prohibited
 Information presentation allowed
 Current position

FIG. 16

| Position | | Travelling direction | Time zone | Number of times of operations |
|---|---|---|---|---|
| Latitude | Longitude | | | |
| 135.577 | 34.756 | Northeast | 8:00 | 1596 |
| 135.577 | 34.756 | Southwest | 8:00 | 2456 |
| 135.577 | 34.7559 | Northeast | 8:00 | 1967 |
| 135.577 | 34.7559 | Southwest | 8:00 | 859 |
| 135.576 | 34.7558 | Northeast | 8:00 | 1235 |
| 135.576 | 34.7558 | Southwest | 8:00 | 23 |
| 135.576 | 34.7557 | Northeast | 8:00 | 56 |
| 135.576 | 34.7557 | Southwest | 8:00 | 25 |
| 135.573 | 34.7550 | Northeast | 8:00 | 146 |
| 135.573 | 34.7550 | Southwest | 8:00 | 2563 |
| 135.565 | 34.74 | Northeast | 8:00 | 78 |
| 135.565 | 34.74 | Southwest | 8:00 | 85 |
| 135.55 | 34.73 | Northeast | 8:00 | 63 |
| 135.55 | 34.73 | Southwest | 8:00 | 1964 |
| ... | ... | ... | ... | ... |
| 135.577 | 34.756 | Northeast | 17:00 | 25 |
| 135.577 | 34.756 | Southwest | 17:00 | 65 |
| 135.577 | 34.7559 | Northeast | 17:00 | 32 |
| 135.577 | 34.7559 | Southwest | 17:00 | 596 |
| 135.576 | 34.7558 | Northeast | 17:00 | 845 |
| 135.576 | 34.7558 | Southwest | 17:00 | 1639 |
| 135.576 | 34.7557 | Northeast | 17:00 | 8436 |
| 135.576 | 34.7557 | Southwest | 17:00 | 675 |
| 135.573 | 34.7550 | Northeast | 17:00 | 4632 |
| 135.573 | 34.7550 | Southwest | 17:00 | 29 |
| 135.565 | 34.74 | Northeast | 17:00 | 1236 |
| 135.565 | 34.74 | Southwest | 17:00 | 74 |
| 135.55 | 34.73 | Northeast | 17:00 | 8693 |
| 135.55 | 34.73 | Southwest | 17:00 | 4593 |
| ... | ... | ... | ... | ... |

Operation information d11

FIG. 19

| Position | | Travelling direction | Time zone | Identification information indicating whether information presentation is allowed |
|---|---|---|---|---|
| Latitude | Longitude | | | |
| 135.577 | 34.756 | Northeast | 8:00 | Allowed |
| 135.577 | 34.756 | Southwest | 8:00 | Allowed |
| 135.577 | 34.7559 | Northeast | 8:00 | Allowed |
| 135.577 | 34.7559 | Southwest | 8:00 | Prohibited |
| 135.576 | 34.7558 | Northeast | 8:00 | Allowed |
| 135.576 | 34.7558 | Southwest | 8:00 | Prohibited |
| 135.576 | 34.7557 | Northeast | 8:00 | Prohibited |
| 135.576 | 34.7557 | Southwest | 8:00 | Prohibited |
| 135.573 | 34.7550 | Northeast | 8:00 | Prohibited |
| 135.573 | 34.7550 | Southwest | 8:00 | Allowed |
| 135.565 | 34.74 | Northeast | 8:00 | Prohibited |
| 135.565 | 34.74 | Southwest | 8:00 | Prohibited |
| 135.55 | 34.73 | Northeast | 8:00 | Prohibited |
| 135.55 | 34.73 | Southwest | 8:00 | Allowed |
| ... | ... | ... | ... | ... |
| 135.577 | 34.756 | Northeast | 17:00 | Prohibited |
| 135.577 | 34.756 | Southwest | 17:00 | Prohibited |
| 135.577 | 34.7559 | Northeast | 17:00 | Prohibited |
| 135.577 | 34.7559 | Southwest | 17:00 | Prohibited |
| 135.576 | 34.7558 | Northeast | 17:00 | Prohibited |
| 135.576 | 34.7558 | Southwest | 17:00 | Allowed |
| 135.576 | 34.7557 | Northeast | 17:00 | Allowed |
| 135.576 | 34.7557 | Southwest | 17:00 | Prohibited |
| 135.573 | 34.7550 | Northeast | 17:00 | Allowed |
| 135.573 | 34.7550 | Southwest | 17:00 | Prohibited |
| 135.565 | 34.74 | Northeast | 17:00 | Allowed |
| 135.565 | 34.74 | Southwest | 17:00 | Prohibited |
| 135.55 | 34.73 | Northeast | 17:00 | Allowed |
| 135.55 | 34.73 | Southwest | 17:00 | Allowed |
| ... | ... | ... | ... | ... |

Map information d12

FIG. 22

| Position | | Number of times of operations | Details of operation | | Answer to response |
|---|---|---|---|---|---|
| Latitude | Longitude | | Target device | Kind of operation | |
| 135.577 | 34.756 | 2511 | Navigation device | Response to presentation information | YES |
| 135.577 | 34.7559 | 325 | Navigation device | Response to presentation information | YES |
| 135.576 | 34.7558 | 99 | Navigation device | Response to presentation information | YES |
| 135.576 | 34.7558 | 26 | Navigation device | Response to presentation information | NO |
| 135.576 | 34.7557 | 0 | Navigation device | Response to presentation information | NO |
| 135.576 | 34.7557 | 0 | Navigation device | Response to presentation information | NO |
| 135.576 | 34.7556 | 0 | Navigation device | Response to presentation information | NO |
| 135.576 | 34.7556 | 0 | Navigation device | Response to presentation information | NO |
| ... | ... | ... | ... | ... | ... |

Operation information d21

FIG. 23

| Position | | Number of times of operations | | | | |
|---|---|---|---|---|---|---|
| Latitude | Longitude | Driver | Passenger in passenger seat | Passenger in right rear seat | Passenger in left rear seat | |
| 135.577 | 34.756 | 2511 | 1134 | 34 | 3457 | |
| 135.577 | 34.7559 | 325 | 3246 | 24 | 7774 | |
| 135.576 | 34.7558 | 125 | 112 | 14 | 5666 | |
| 135.576 | 34.7557 | 0 | 0 | 0 | 0 | |
| 135.576 | 34.7557 | 0 | 0 | 0 | 0 | |
| 135.576 | 34.7556 | 0 | 0 | 0 | 0 | |
| 135.576 | 34.7556 | 0 | 0 | 0 | 0 | |
| ... | ... | ... | ... | ... | ... | |

Operation information d31

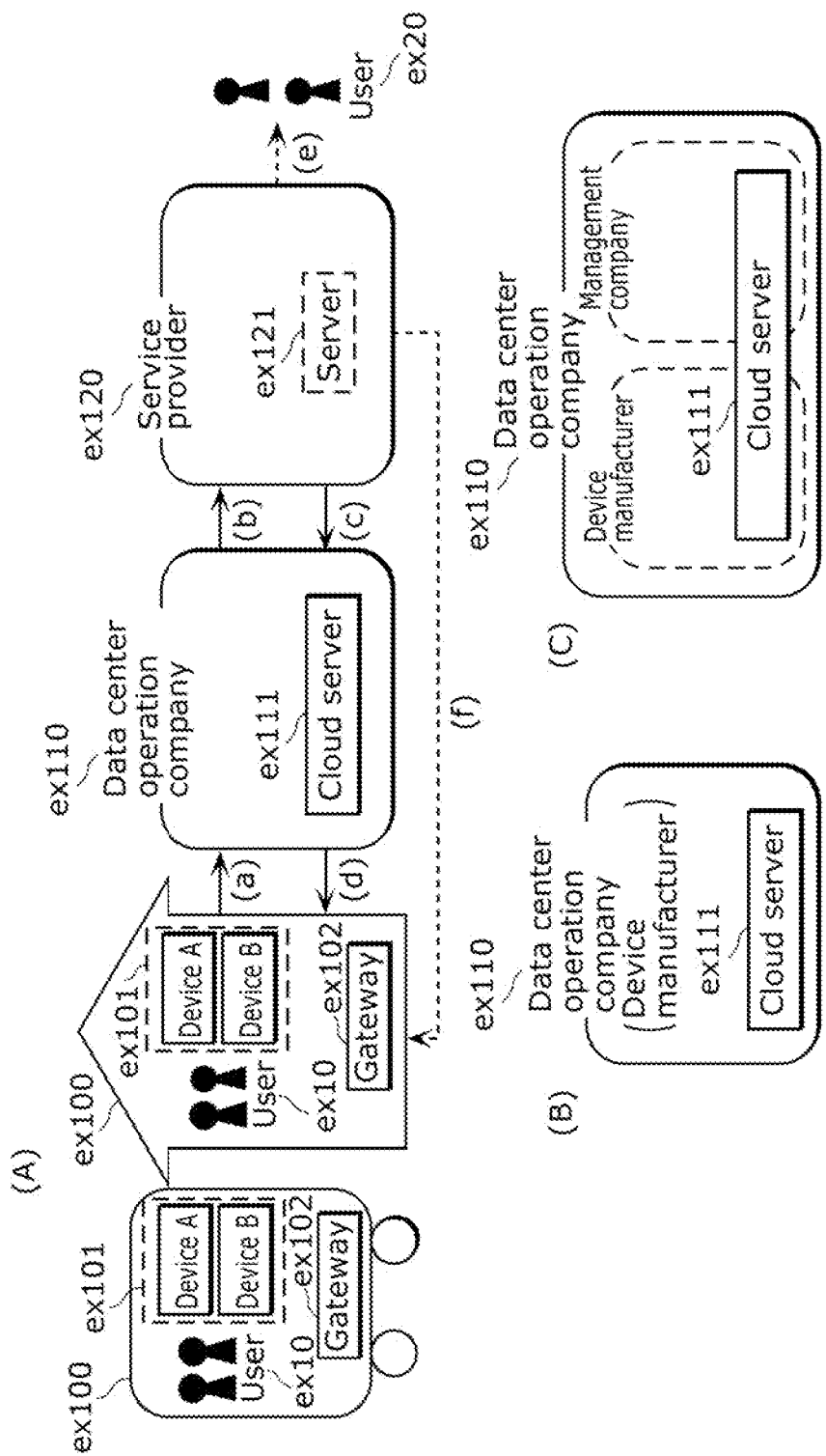

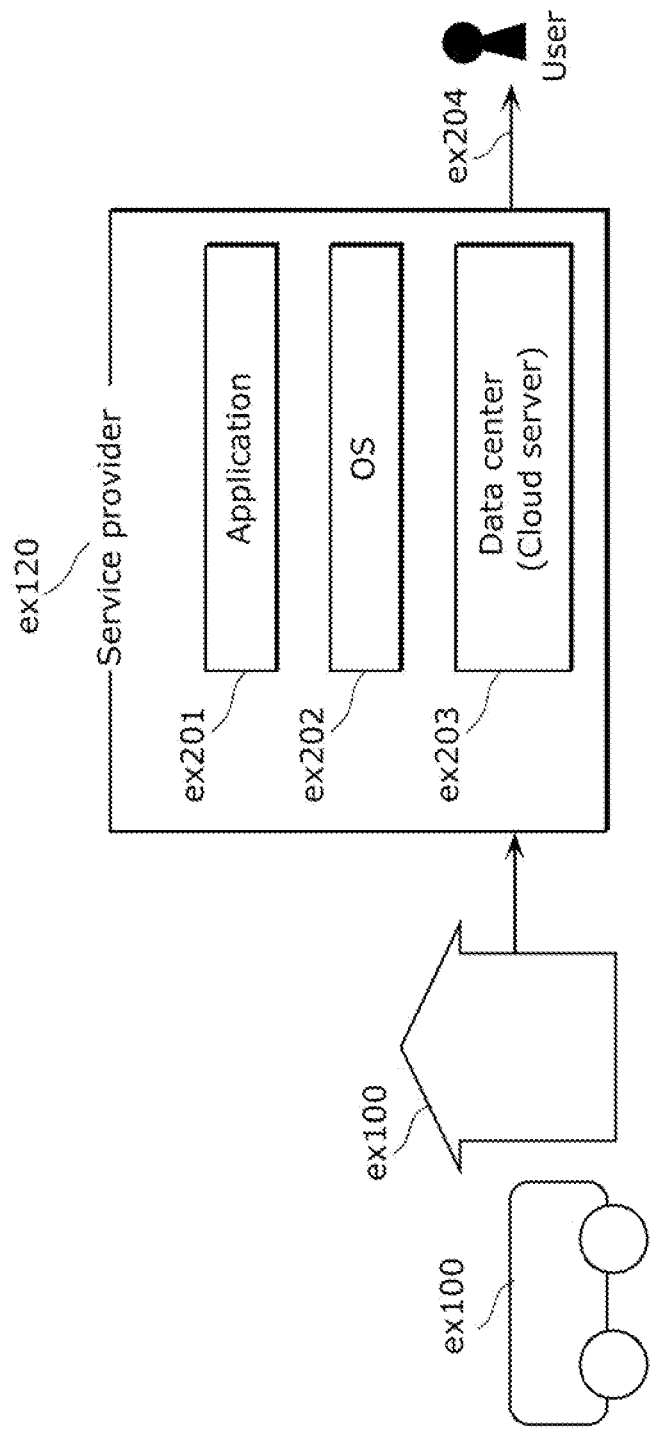

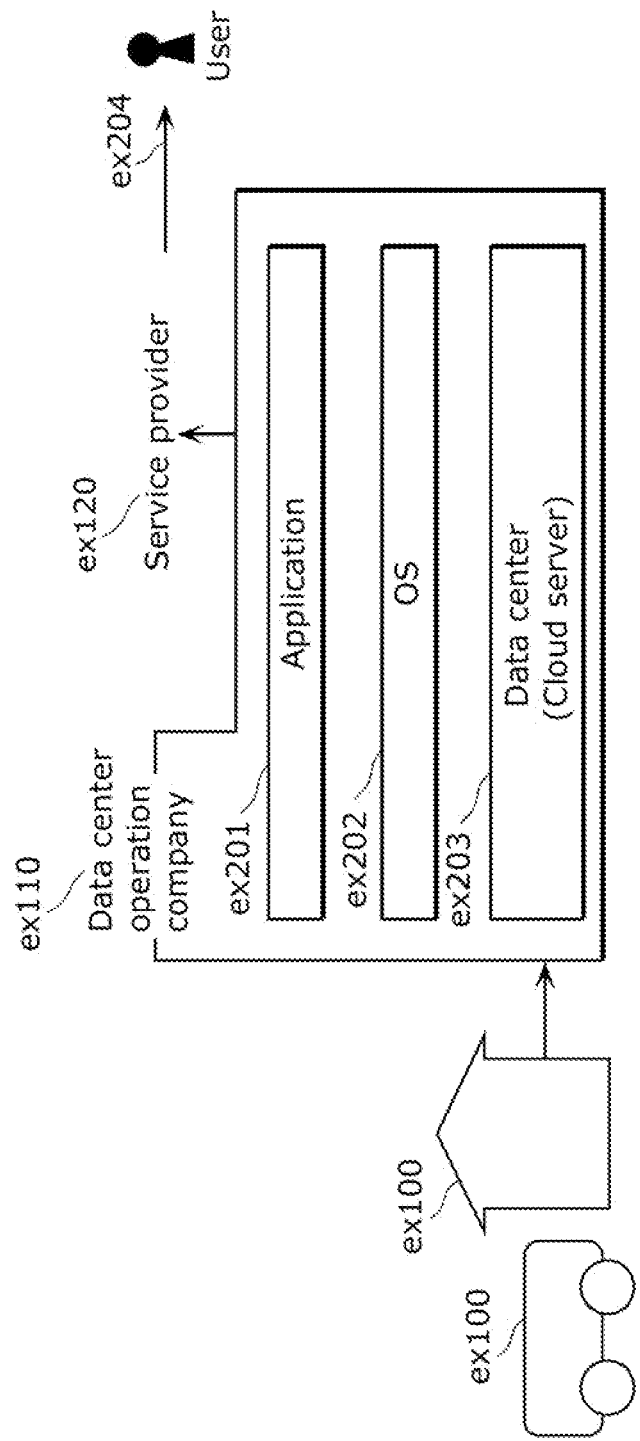

MAP INFORMATION CREATION DEVICE, INFORMATION PRESENTATION DEVICE, MAP INFORMATION CREATION METHOD AND INFORMATION PROVISION METHOD

TECHNICAL FIELD

The present invention relates to a device which creates map information, and to an information presentation device which performs information presentation using the map information.

BACKGROUND ART

Conventionally, devices which perform information presentation using map information have been proposed (see Patent Literature (PTL) 1). The device in PTL 1 is a car navigation device, and uses map database (map information) in which reference reluctance values are assigned with landmarks. Each reference reluctance value indicates a degree of a feeling of reluctance of a driver. In other words, the car navigation device provides guidance regarding the landmarks such as a bridge, a tunnel, and a railroad crossing, based on the reference reluctance values.

CITATION LIST

Patent Literature

[PTL 1]
International Patent Application Publication No. 2005/017458

SUMMARY OF INVENTION

Technical Problem

However, the car navigation device in PTL 1 has a problem of being incapable of presenting information at a right time, even using the map database.

In view of this, the present invention provides a map information creation device which creates map information for making it possible to perform information presentation at a right time, and an information presentation device which presents information using the map information.

Solution to Problem

A map information creation device according to an aspect of the present invention is a map information creation device which creates map information, including: an operation obtaining unit configured to obtain operation information indicating (i) each of positions passed through by a movable body that is moved by a user and (ii) a frequency of an operation performed on a device by a user of the movable body when the movable body is at the position; a determining unit configured to determine, for each of positions on a map, whether or not information presentation is allowed, based on the frequency at the position indicated by the operation information; and a creating unit configured to create the map information indicating a result of the determination by the determining unit for each position on the map.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The map information creation device and the information presentation device according to the present invention are capable of presenting information at a right time.

BRIEF DESCRIPTION OF DRAWINGS

FIG. 5A is a diagram for illustrating an example of an operation by a user according to the embodiment.

FIG. 10B is another illustration for illustrating a map information according to this embodiment.

FIG. 16 is a diagram illustrating examples of details of operation information according to the variation of the embodiment.

FIG. 19 is a diagram illustrating examples of details of map information according to the variation of the embodiment.

FIG. 22 is a diagram illustrating examples of details of operation information according to the variation of the embodiment.

FIG. 23 is a diagram illustrating examples of pieces of operation information each indicating the number of times of operations performed by a passenger according to the variation of the embodiment.

FIG. 31 is an illustration of an entire configuration of an information provision system applicable to the embodiment and a variation thereof.

FIG. 32 is an illustration of a service type 1 (company's own data center type) applicable to the embodiment and the variation thereof.

FIG. 35 is an illustration of a service type 4 (SaaS-based type) applicable to the embodiment and the variation thereof.

Figure 1:
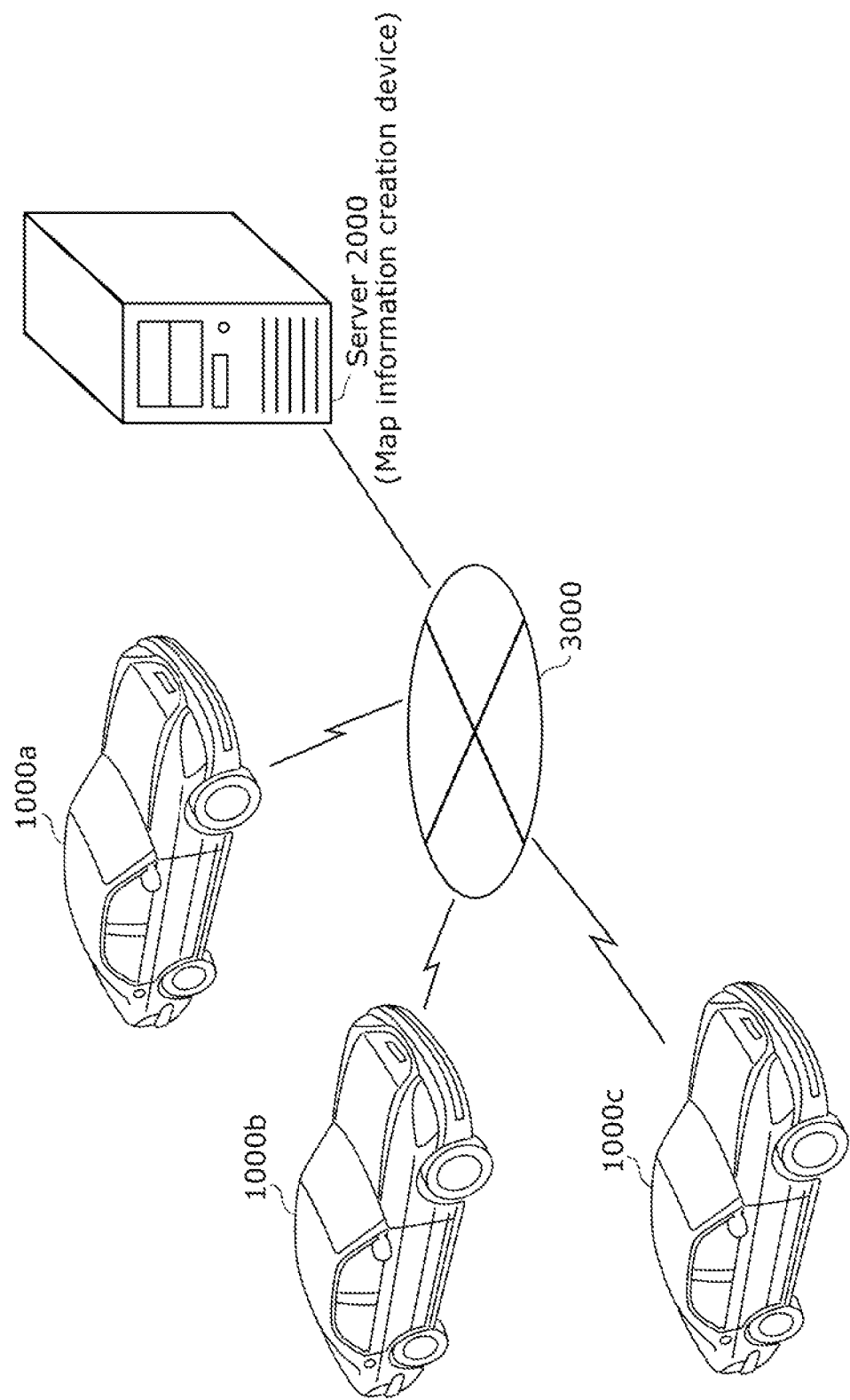
FIG. 1 is a diagram illustrating a configuration of a system according to an embodiment.

DESCRIPTION OF EMBODIMENTS (Underlying Knowledge Forming Basis of the Present Disclosure)

In relation to the car navigation device disclosed in the Background section, the inventors have found the problem below.

The car navigation device according to PTL 1 presents guidance regarding a preset nearby landmark when the landmark is present in a current area. Accordingly, when there is no nearby landmark in the area, the guidance cannot be presented. When the nearby landmark is present in the area, the guidance may be presented irrespective of the state of a driver who is the user of the car navigation device. In other words, there is a problem that the guidance is presented even while the driver is concentrating on driving and cannot pay attention to any situation other than the driving. Furthermore, the car navigation device according to PTL 1 merely presents information related to the guidance of the landmark, and cannot present any other information.

In order to solve the problem, a map information creation device according to an aspect of the present invention is a map information creation device which creates map information, including: an operation obtaining unit configured to obtain operation information indicating (i) each of positions passed through by a movable body that is moved by a user and (ii) a frequency of an operation performed on a device by a user of the movable body when the movable body is at the position; a determining unit configured to determine, for each of positions on a map, whether or not information presentation is allowed, based on the frequency at the position indicated by the operation information; and a creating unit configured to create the map information indicating a result of the determination by the determining unit for each position on the map.

In this way, whether or not the information presentation is allowed at the position is determined for each position on the map, based on a history indicating the frequency of the operation performed on the device by the user when the movable body is at the position, and the map information indicating the result of the determination is created. As a result, the map information can indicate, for each position, whether or not the information presentation is allowed, based on a user state or load identified based on the frequency of operations at the position. Accordingly, the use of the map information like this makes it possible to present arbitrary information at a right time for the user state or load, irrespective of whether a nearby landmark is present. The movable body may be a car, a wireless terminal mounted on a car, a mobile phone, or the like. The movable body may be any one that is moved by the user, and thus does not always need to be moved together with the user. The device may be the movable body itself, a device mounted on the movable body, or a device which is not provided with the movable body. The frequency may be the number of times of operations, or a ratio (probability).

In addition, the determining unit may be configured to determine, for each position on the map, that the information presentation is allowed when the frequency at the position indicated by the operation information is higher than a threshold value.

In this way, for example, in the case where the movable body moves when the user drives and the frequency of operations indicated by the operation information is the frequency of operations unrelated to the driving, the driving load on the user is small at the position at which the frequency is higher than the threshold value. Accordingly, map information indicating that the information presentation at the position is allowed is created, it is possible to present information at a time when the user load is small, stated differently, at the right time when the user can afford to pay attention to the information.

In addition, the operation information may indicate the frequency of the operation performed on the device by the user in each of situations indicated by combinations of one of the positions passed through by the movable body and one of moving directions of the movable body after passing through the position, the determining unit may be configured to determine, for each of the combinations of the positions on the map and the directions, whether or not the information presentation is allowed, based on the frequency corresponding to the combination, the combination being indicated by the operation information, and the creating unit may be configured to create the map information indicating the result of the determination for each combination by the determining unit.

For example, even when the movable body passes through the same position, a load on the user who moves the movable body may vary between the case where the movable body moves to the east and the case where the movable body moves to the west. In view of this, in the above aspect, map information indicating the result of the determination for each of combinations of one of the positions and one of the directions on the map is created, which makes it possible to present the information to the user at a right time.

In addition, the operation information may indicate the frequency of the operation performed on the device by the user in each of situations indicated by combinations of one of the positions passed through by the movable body and one of time zones each including a time when the movable body passed through the position, the determining unit may be configured to determine, for each of the combinations of the positions on the map and the directions, whether or not the information presentation is allowed, based on the frequency corresponding to the combination, the combination being indicated by the operation information, and the creating unit may be configured to create the map information indicating the result of the determination for each combination by the determining unit.

For example, even when the movable body passes through the same position, a load on the user who moves the movable body may vary between the case where the movable body moves at 8 o'clock and the case where the movable body moves at 17 o'clock. In view of this, in the above aspect, map information indicating the result of the determination for each of combinations of the positions on the maps and the time zones is created, which makes it possible to present the information to the user at a right time.

In addition, the operation information may indicate the frequency of the operation performed on the device by the user in each of situations indicated by combinations of one of the positions passed through by the movable body, one of moving directions of the movable body after passing through the position, and one of time zones each including a time when the movable body passed through the position, the determining unit may be configured to determine, for each of the combinations of the positions on the map, the directions, and time zones, whether or not the information presentation is allowed, based on the frequency corresponding to the combination, the combination being indicated by the operation information, and the creating unit may be configured to create the map information indicating the result of the determination for each combination by the determining unit.

In this way, map information indicating the result of the determination for each of combinations of the positions and directions on the map, and the time zones is created, which makes it possible to present the information to the user at a preferable time.

In addition, the operation information may indicate, for each position passed through by the movable body, the position, the operation performed on the device by the user when the movable body was at the position, and the frequency of the operation, and the determining unit may be configured to determine, for each position on the map, whether or not the information presentation is allowed, based on the operation at the position indicated by the operation information and the frequency of the operation. For example, the determining unit may be configured to determine that the information presentation is prohibited at the position indicated by the operation information among the positions when the frequency at the position indicated by the operation information is higher than the threshold value and the operation at the position is an operation that prohibits the information presentation.

In this way, when the operation information indicates that a high frequency of operations that prohibit information presentation at a certain position, map information indicating that information presentation is prohibited at the position is created. Thus, it is possible to present information at a right time for the situation indicated by a user taste etc.

Furthermore, in order to solve the above-described problem, an information presentation device according to an aspect of the present invention is an information presentation device which presents information, including: a map obtaining unit configured to obtain map information indicating a load of the user as a user load required for the user to cause the movable body to pass through each position on a route along which the movable body can be moved on a map; a position obtaining unit configured to obtain position information indicating a position of the movable body; an information obtaining unit configured to obtain presentable information; a deciding unit configured to identify the user load at the position indicated by the position information obtained with reference to the map information, and decide whether or not to present the presentable information obtained, based on the identified user load; and a presenting unit configured to present the presentable information by causing an output unit to output the presentable information when the deciding unit decides that the presentable information is presented.

In this way, whether or not the presentable information is presented is decided based on the user load. Thus, it is possible to present the presentable information at a right time for the user load, irrespective of whether or not a nearby landmark is present.

In addition, the map obtaining unit may be configured to obtain the map information indicating the user load for each position on the route, by indicating identification information for identifying whether the information presentation is allowed, the map information may indicate a small user load by indicating the identification information which identifies that the information presentation is allowed, and a large user load by indicating the identification information which identifies that the information presentation is prohibited, and the deciding unit may be configured to identify the identification information at the position indicated by the position information obtained with reference to the map information, and, when the identification information determined identifies that the information presentation is allowed, decide that the presentable information obtained is presented.

In this way, the identification information for identifying whether or not the information presentation is allowed is indicated in the map information. Thus, it is possible to present the presentable information at a precisely right time.

In addition, the map obtaining unit may be configured to indicate the identification information which identifies that the information presentation is allowed when the frequency of the operation performed on the device by the user when the movable body is at the position is higher than the threshold value, and obtain the map information indicating the identification information which identifies that the information presentation is prohibited when the frequency of the operation is lower than or equal to the threshold value.

In this way, it is possible to present the presentable information at the time when the user can afford to pay attention to the presentable information and the number of times of operations on the device increases.

In addition, the information presentation device according to claim 10, may further include: a direction obtaining unit configured to obtain direction information indicating a direction in which the movable body moves; and a time obtaining unit configured to obtain time information indicating a current time, wherein the map obtaining unit may be configured to obtain the map information indicating the identification information for each of combinations of one of the positions on the route, one of directions on the route, and one of time zones, and the deciding unit may be configured to identify, with reference to the map information, the identification information which is associated with a combination of the position indicated by the position information obtained, the direction indicated by the direction information obtained, and the time zone including the time indicated by the time information obtained, and, when the identification information identifies that the information presentation is allowed, decide that the presentable information obtained is presented.

In this way, it is possible to present the presentable information at the right time for the position of the movable body, the moving direction of the movable body, and the time.

It is to be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, an embodiment is described with reference to the drawings.

Each of the embodiments described below indicates a general or specific example. The numerical values, shapes, materials, constituent elements, the arrangement and connection of the constituent elements, steps, the processing order of the steps etc. shown in the following exemplary embodiments are mere examples, and therefore do not limit the present invention. Therefore, among the constituent elements in the following exemplary embodiments, constituent elements not recited in any one of the independent claims each defining the most generic concept are described as arbitrary constituent elements.

[Embodiment]

FIG. 1 is a diagram illustrating a configuration of a system according to an embodiment.

The system according to this embodiment includes, for example, wireless terminals each mounted on one of cars 1000*a* to 1000*c*, and a server 2000 connected to each of the wireless terminals via a communication network 3000.

A device such as the wireless terminal provided with the one of the cars 1000*a* to 1000*c* moves as a movable body when a user (driver) drives. The server 2000 communicates with each of the cars 1000*a* to 1000*c* via the communication network 3000. It is to be noted that the wireless terminal mounted on each of the cars 1000*a* to 1000*c* may be any movable body that moves when the driver drives, and may be a terminal mounted on each of the cars 1000*a* to 1000*c* in advance or a mobile terminal that can be carried separately from each of the cars 1000*a* to 1000*c*. The wireless terminal does not always need to have a terminal function and a wireless function integrally. For example, the terminal function may be implemented by a car navigation device or the like that does not have any wireless function, and the wireless function may be implemented by a tethering function etc. of a mobile phone.

Specifically, the wireless terminal creates operation information indicating an operation on a device performed by a user, and transmits the operation information to the server 2000. The server 2000 receives the operation information transmitted from each of the wireless terminals, and creates map information for determining a time when presentable information is presented to the user, using the operation information. The server 2000 transmits the map information to each of the wireless terminals of the cars 1000*a* to 1000*c*. Upon receiving the map information, the wireless terminal presents the presentable information to the user according to the time indicated by the map information. This presentable information is information obtained via a communication network such as the Internet, or a local storage. In the descriptions provided hereinafter regarding each of the cars 1000*a* to 1000*c*, the car 1000*a* is taken as an exemplary representative.

Figure 2:
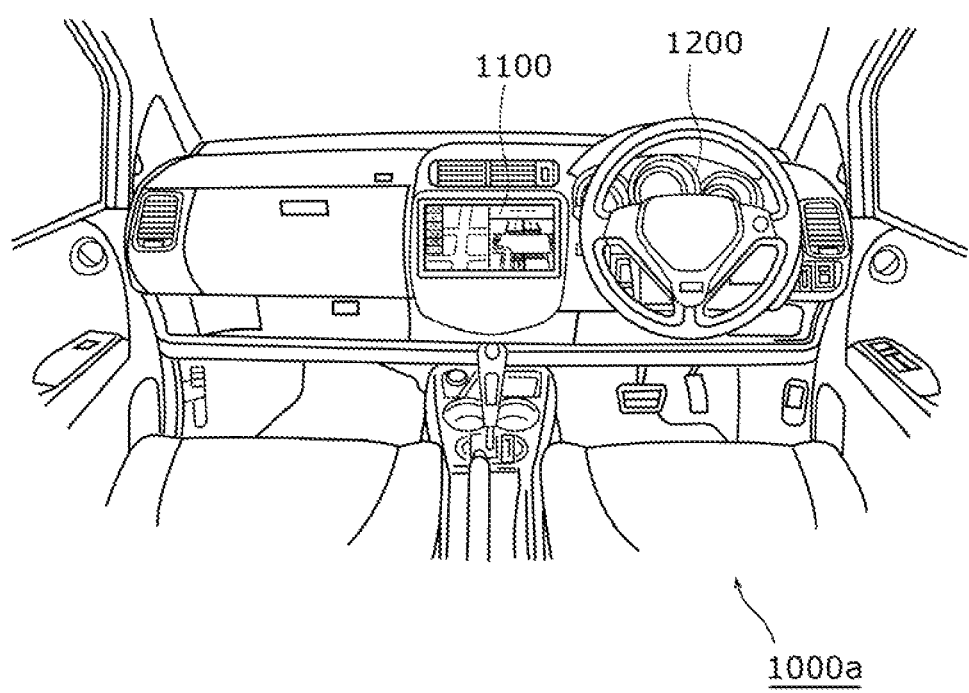
FIG. 2 is a diagram illustrating a wireless terminal according to the embodiment.

FIG. 2 is a diagram illustrating a wireless terminal according to this embodiment.

The wireless terminal 1100 has a function as, for example, a navigation device (car navigation device), and is provided at a left side of a handle of the car 1000*a*. The car 1000*a* has an instrument panel (inpane) 1200 including a liquid crystal display that displays at least one of a speed, a rotational speed, etc. of the car 1000*a*. The instrument panel 1200 is also referred to as a meter display, a display meter, a panel display, or the like. The wireless terminal 1100 may display information on the instrument panel 1200, or on a head-up display.

Figure 3:
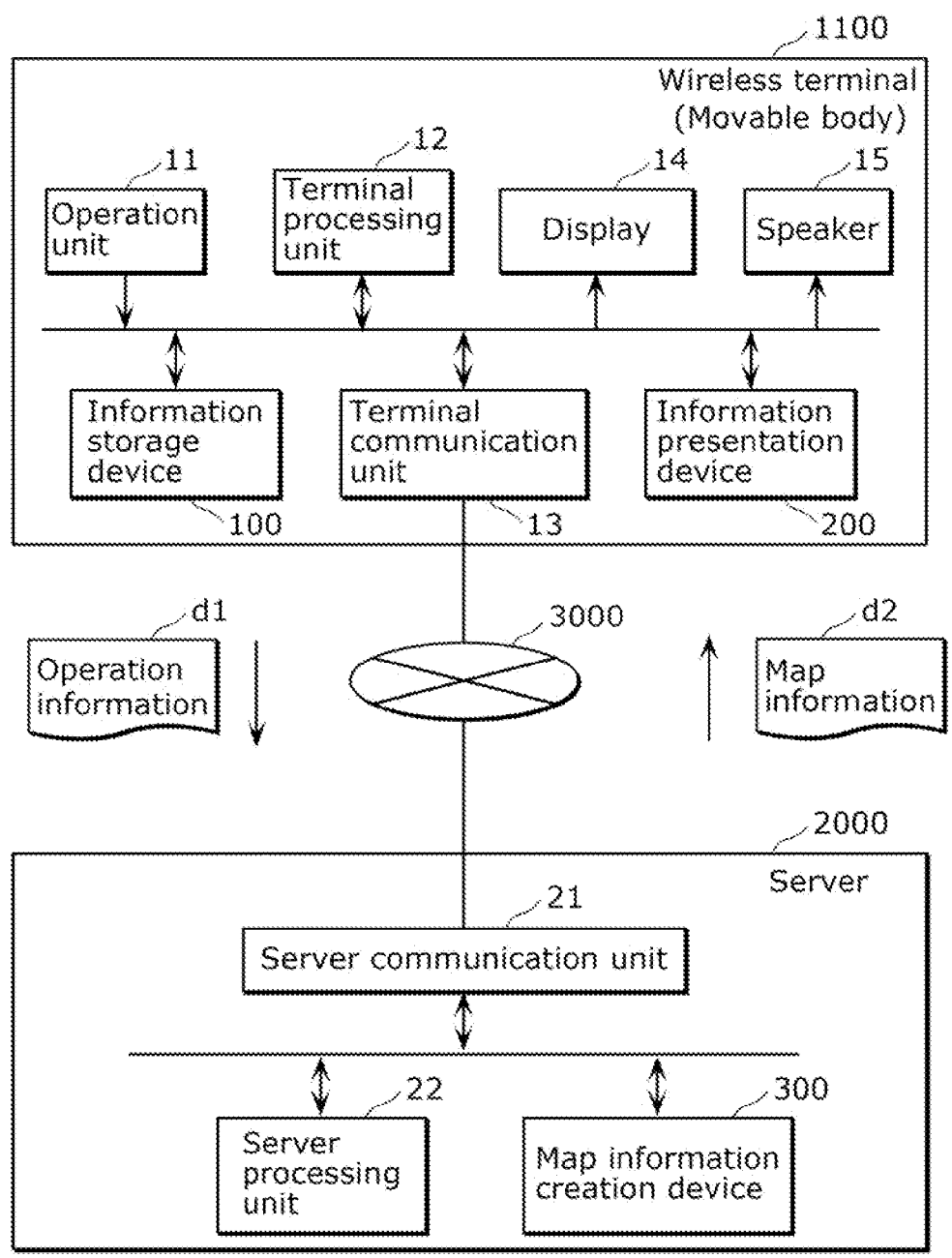
FIG. 3 is a block diagram illustrating a configuration including the wireless terminal and a server according to the embodiment.

FIG. 3 is a block diagram illustrating a configuration including the wireless terminal 1100 and the server 2000 according to the embodiment.

The wireless terminal 1100 includes an information storage device 100, an information presentation device 200, an operation unit 11, a terminal processing unit 12, a terminal communication unit 13, a display 14, and a speaker 15.

The operation unit 11 receives an operation performed by the user. The terminal processing unit 12 executes main processing of the wireless terminal 1100. For example, the terminal processing unit 12 executes processing for navigating the car based on the operation received by the operation unit 11, and outputs the result from the display 14 and the speaker 15. The terminal communication unit 13 communicates with the server 2000 via the communication network 3000.

The information storage device 100 creates the operation information d1, and transmits the operation information d1 to the server 2000 via the terminal communication unit 13.

The information presentation device 200 obtains the map information d2 from the server 2000 via the terminal processing unit 13, and presents, to the user, the presentable information at the time according to the map information d2. More specifically, the information presentation device 200 presents, to the user, the presentable information by causing an output unit that is at least one of the display 14 and the speaker 15 to output the presentable information.

The server 2000 includes a server communication unit 21, a server processing unit 22, and a map information creation device 300.

The server communication unit 21 communicates with the wireless terminal 1100 via the communication network 3000. The server processing unit 22 executes main processing of the server 2000. For example, the sever processing unit 22 creates area information indicating sightseeing facilities in the area in which the wireless terminal 1100 and the car 1000a are present, and transmits the area information to the wireless terminal 1100 via the server communication unit 21.

The map information creation device 300 obtains, via the server communication unit 21, the operation information d1 created by the information storage device 100 of the wireless terminal 1100. The map information creation device 300 creates the map information d2 using the operation information d1. The map information creation device 300 transmits the map information d2 to the wireless terminal 1100 via the server communication unit 21.

Figure 4:
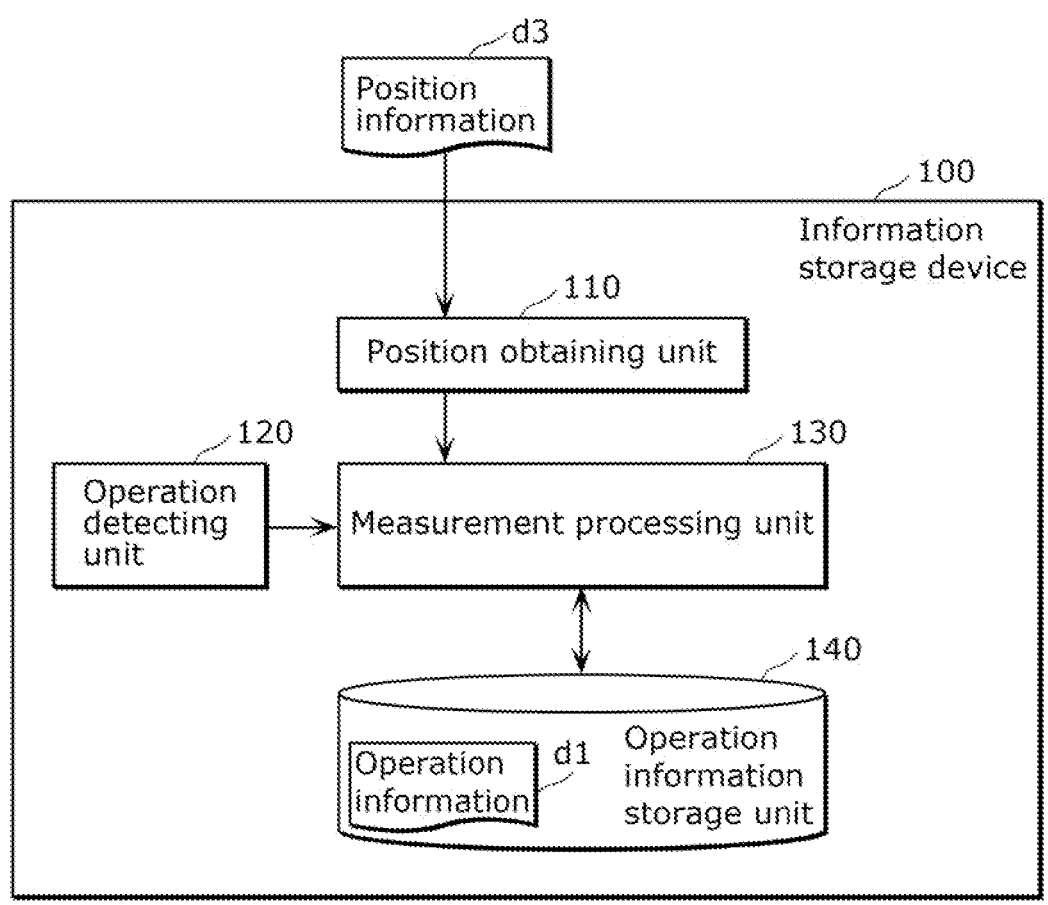
FIG. 4 is a block diagram illustrating a configuration of an information storage device according to the embodiment.

FIG. 4 is a block diagram illustrating a configuration of the information storage device 100 according to this embodiment.

The information storage device 100 includes a position obtaining unit 110, an operation detecting unit 120, a measurement processing unit 130, and an operation information storage unit 140.

The position obtaining unit 110 obtains position information d3 that is information indicating a current position of the wireless terminal 1100 at, for example, a predetermined cycle. The position information d3 indicates the current position of the wireless terminal 1100 using longitude and latitude. The position information d3 is created through, for example, processing using a global positioning system (GPS) performed by the terminal processing unit 12. The position obtaining unit 110 outputs the obtained position information d3 to the measurement processing unit 130.

The operation detecting unit 120 detects an operation on the device performed by the user. The device may be the wireless terminal 1100, or an air conditioning device such as an air conditioner provided in the car 1000a. When the device is the wireless terminal 1100, the operation detecting unit 120 detects an operation on the operation unit 11 performed by the user. The operation detecting unit 120 notifies the result of the detection to the measurement processing unit 130.

The operation information storage unit 140 stores operation information d1 that indicates, for each of positions, the position and the number of times of operations that is the frequency of the operations performed by the user at the position.

Upon receiving the position information d3 from the position obtaining unit 110, the measurement processing unit 130 obtains the result of the detection by the operation detecting unit 120 at the time of receiving. Furthermore, the measurement processing unit 130 reads the operation information d1 from the operation information storage unit 140. The measurement processing unit 130 determines whether or not the position indicated by the position information d3 is already written in the operation information d1, and determines whether or not the operation by the user was detected, stated differently, the operation by the user was performed, based on the obtained result of the detection. The measurement processing unit 130 executes processing below based on the results of the determinations.

More specifically, when the position indicated by the position information d3 was already written in the operation information d1 and the operation by the user was detected, the measurement processing unit 130 increments (counts up) the number of times of operations associated with the position in the operation information d1. The measurement processing unit 130 updates, to the counted number of times of operations, the number of times of operations associated with the position in the operation information d1 stored in the operation information storage unit 140. When the position indicated by the position information d3 was already written in the operation information d1 and no corresponding operation by the user was detected, the measurement processing unit 130 terminates the processing without modifying the operation information d1.

On the other hand, when the position indicated by the position information d3 was not written in the operation information d1 and the operation by the user was detected, the measurement processing unit 130 writes, in an associated manner, the position and "1" that is the number of times of operations in the operation information d1 stored in the operation information storage unit 140. In addition, when the position indicated by the position information d3 was not written in the operation information d1 and no corresponding operation by the user was detected, the measurement processing unit 130 writes, in an associated manner, the position and "0" that is the number of times of operations in the operation information d1 stored in the operation information storage unit 140.

Figure 5B:
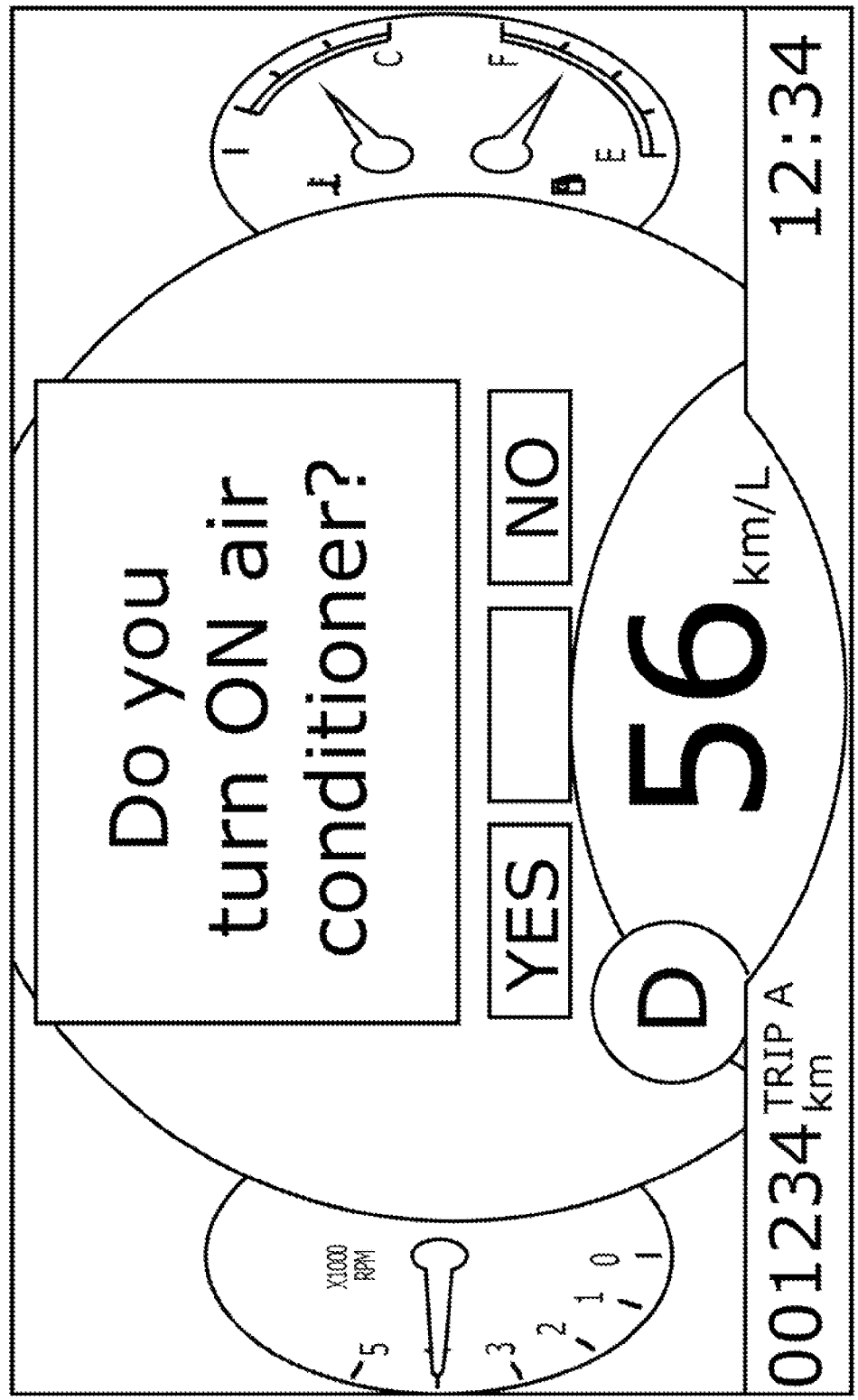
FIG. 5B is a diagram for illustrating an example of an operation by the user according to the embodiment.

Each of FIGS. 5A and 5B is a diagram for illustrating an exemplary operation performed by the user.

For example, as illustrated in FIG. 5A, the controller provided in the car 1000a displays at least one of a speed meter, a tachometer, etc. of the car 1000a on the instrument panel 1200. As illustrated in FIG. 5B, the controller displays a message of "Do you turn ON air conditioner" on the instrument panel 1200. At this time, when the user turns ON the air conditioner, the operation detecting unit 120 detects the user operation on the air conditioner. As a result, the measurement processing unit 130 updates or writes to the operation information d1 stored in the operation information storage unit 140 as described above.

Figure 6:
FIG. 6 is a diagram illustrating examples of details of operation information according to the embodiment.

FIG. 6 is a diagram illustrating examples of details of the operation information d1 according to the embodiment.

As illustrated in FIG. 6, the operation information d1 indicates, for each of the positions, the position and the number of times of operations (operation times) performed at the position in an associated manner. For example, the operation information d1 indicates, as the position, longitude of "135.577" and latitude of "34.756", and indicates the number of times of operations "2511" in association with the position. The operation information d1 is sequentially updated by the measurement processing unit 130. In addition, the measurement processing unit 130 transmits the operation information d1 stored in the operation information storage unit 140 to the server 2000 via the terminal communication unit 13 of the wireless terminal 1100, for example, in response to a request from the server 2000 or at a predetermined cycle.

Figure 7:
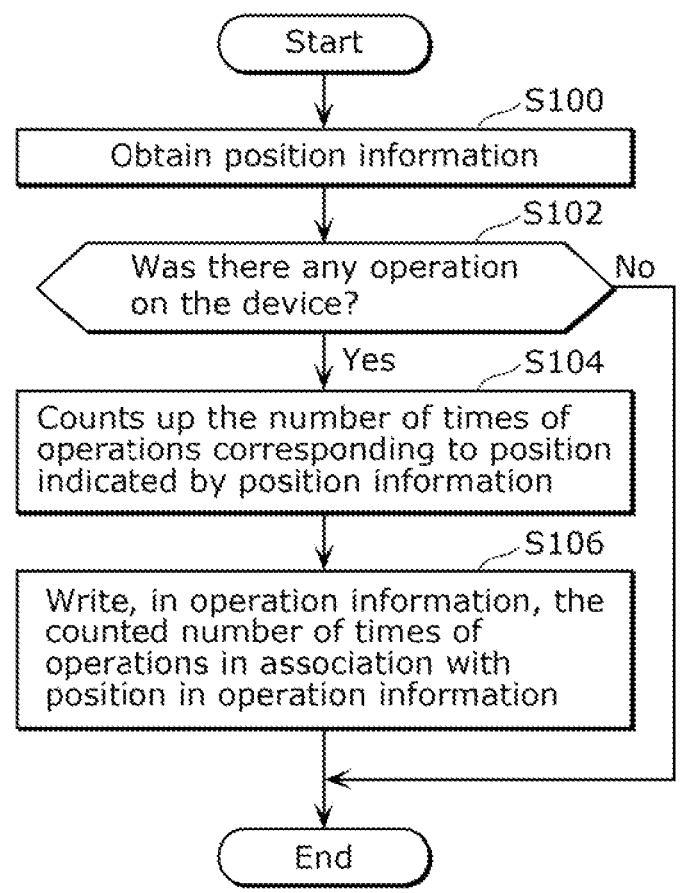
FIG. 7 is a flowchart of processing operations performed by an information storage device according to the embodiment.

FIG. 7 is a flowchart of processing operations performed by the information storage device 100. To simplify illustration, FIG. 7 indicates a processing operation performed when the position indicated by the position information d3 was already in the operation information d1 stored in the operation information storage unit 140.

First, the position obtaining unit 110 obtains the position information d3 (Step S100). Next, the measurement processing 130 determines whether or not there was any operation on the device performed by the user, based on the result of the detection by the operation detecting unit 120 (Step S102). Here, when it is determined that there was the operation (Yes in Step S102), the measurement processing 130 reads the number of times of operations associated with the position of the position information d3 in the operation information d1, and counts up the number of times of operations (Step S104). The measurement processing unit 130 then updates, to the counted number of times of operations, the number of times of operations associated with the position in the operation information d1 stored in the operation information storage unit 140 (Step S106). On the other hand, when it is determined that there was not such an operation (No in Step S102), the information storage device 100 terminates the processing on the obtained position information d3.

As described above, when the position of the position information d3 is not indicated in the operation information d1, the measurement processing unit 130 writes the position and the number of times of operations "1" or "0" to the operation information d1 in an associated manner.

Figure 8:
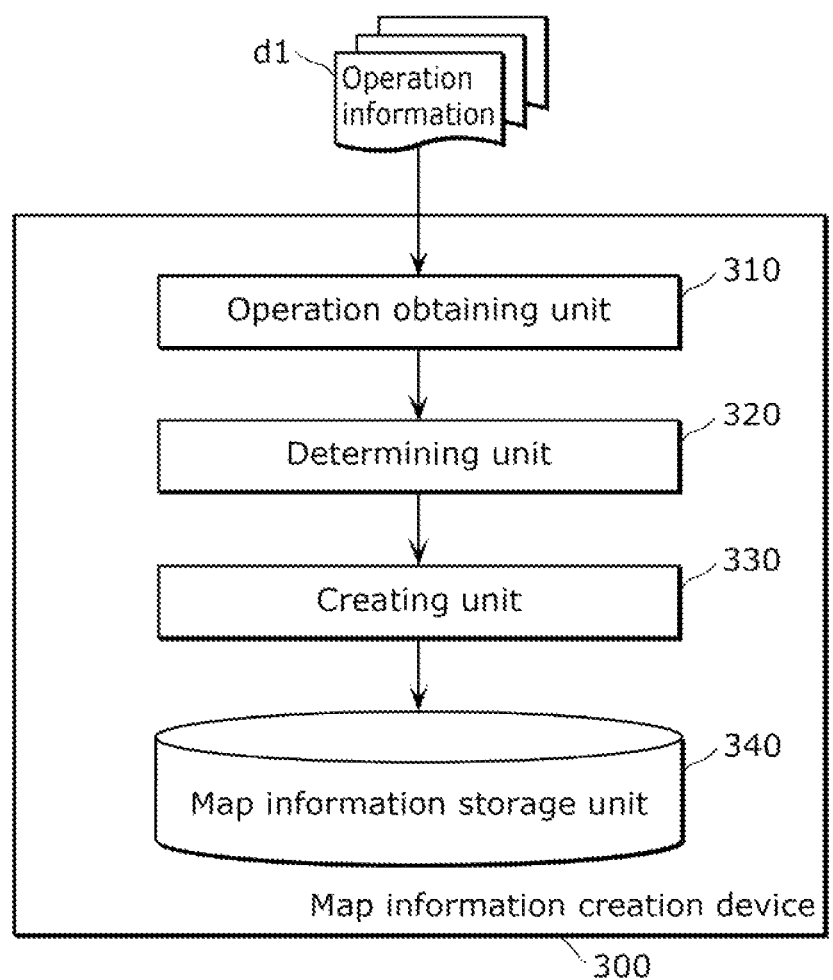
FIG. 8 is a block diagram illustrating a configuration of a map information creation device according to the embodiment.

FIG. 8 is a block diagram illustrating a configuration of the map information creation device 300.

The map information creation device 300 includes an operation obtaining unit 310, a determining unit 320, a creating unit 330, and a map information storage unit 340. The information obtaining unit 310 obtains the operation information d1 created by the information storage device 100 of the wireless terminal 1100. Stated differently, the information obtaining unit 310 obtains the operation information d1 indicating the position passed through by the movable body that is moved by the user and the frequency of operations (the number of times of operations) performed on the device by the user of the movable body when the movable body was at the position. The determining unit 320 determines, for each of the positions on the map, whether or not information presentation to the user is allowed by the wireless terminal 1100, based on the number of times (frequency) of operations at the position indicated by the operation information d1.

The creating unit 330 creates the map information d2 indicating, for each of the positions on the map, the result of the determination by the determining unit 320. Furthermore, the creating unit 330 stores the created map information d2 in the map information storage unit 340.

Figure 9:
FIG. 9 is a diagram illustrating examples of details of map information according to the embodiment.

FIG. 9 is a diagram illustrating examples of details of the map information d2.

The map information d2 indicates, for each of the positions, the position and the identification information associated with the position. The identification information is information for identifying whether or not information presentation is allowed. For example, the map information d2 indicates, as the position, longitude of "135.577" and latitude of "34.756", and indicates the identification information "allowed" in association with the position. It is to be noted that the identification information "allowed" indicates that information presentation is allowed, and the identification information "prohibited" indicates that information presentation is prohibited. Stated differently, the identification information "allowed" identifies that the information presentation is allowed, and the identification information "prohibited" identifies that the information presentation is prohibited.

Figure 10A:
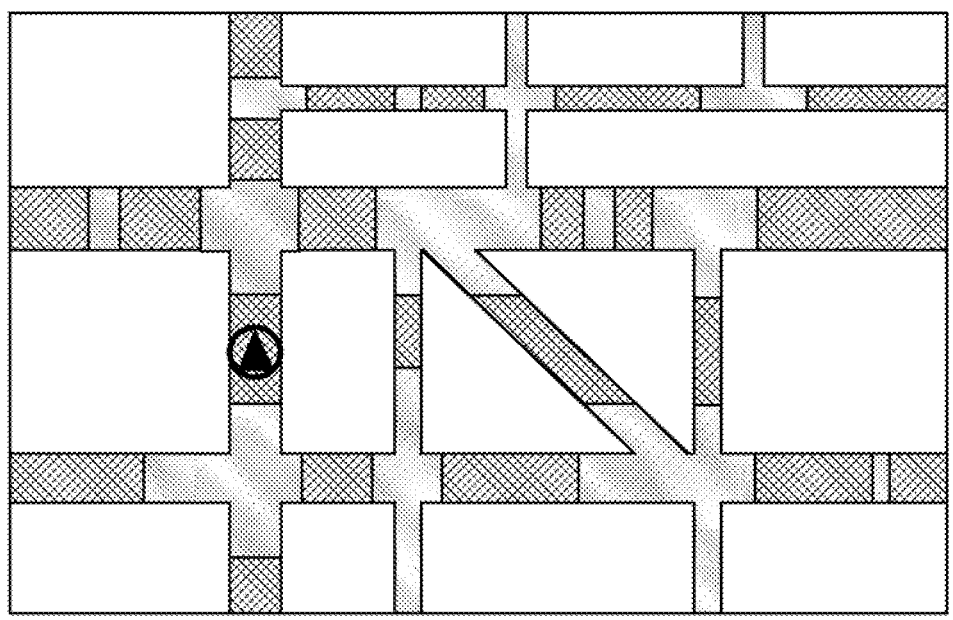
FIG. 10A is an illustration for illustrating a map information according to this embodiment.

FIG. 10A is an illustration for illustrating the map information d2.

The map information d2 illustrated in FIG. 9 is presented as illustrated in FIG. 10A by plotting the identification information on the map. In FIG. 10A, the parts hatched with dots show areas with the identification information "prohibited", specifically, the areas (presentation prohibited areas) in which information presentation to the user by the wireless terminal 1100 is prohibited, and the parts hatched with oblique lines show areas with the identification information "prohibited", specifically, the areas (presentation allowed areas) in which information presentation to the user by the wireless terminal 1100 is allowed. For example, as illustrated in FIG. 10A, the car 1000a moves, and the position (current location) of the car 1000a is included in one of the parts hatched with oblique lines (presentation allowed areas). At this time, the information presentation to the user by the wireless terminal 1100 is allowed.

FIG. 10B is an illustration for illustrating the map information d2.

As in FIG. 10A, the car 1000a further moves, and the position (current location) of the car 1000a is included in one of the parts hatched with dots (presentation prohibited areas), as illustrated in, for example, FIG. 10B. At this time, the information presentation to the user by the wireless terminal 1100 is prohibited.

Figure 11:
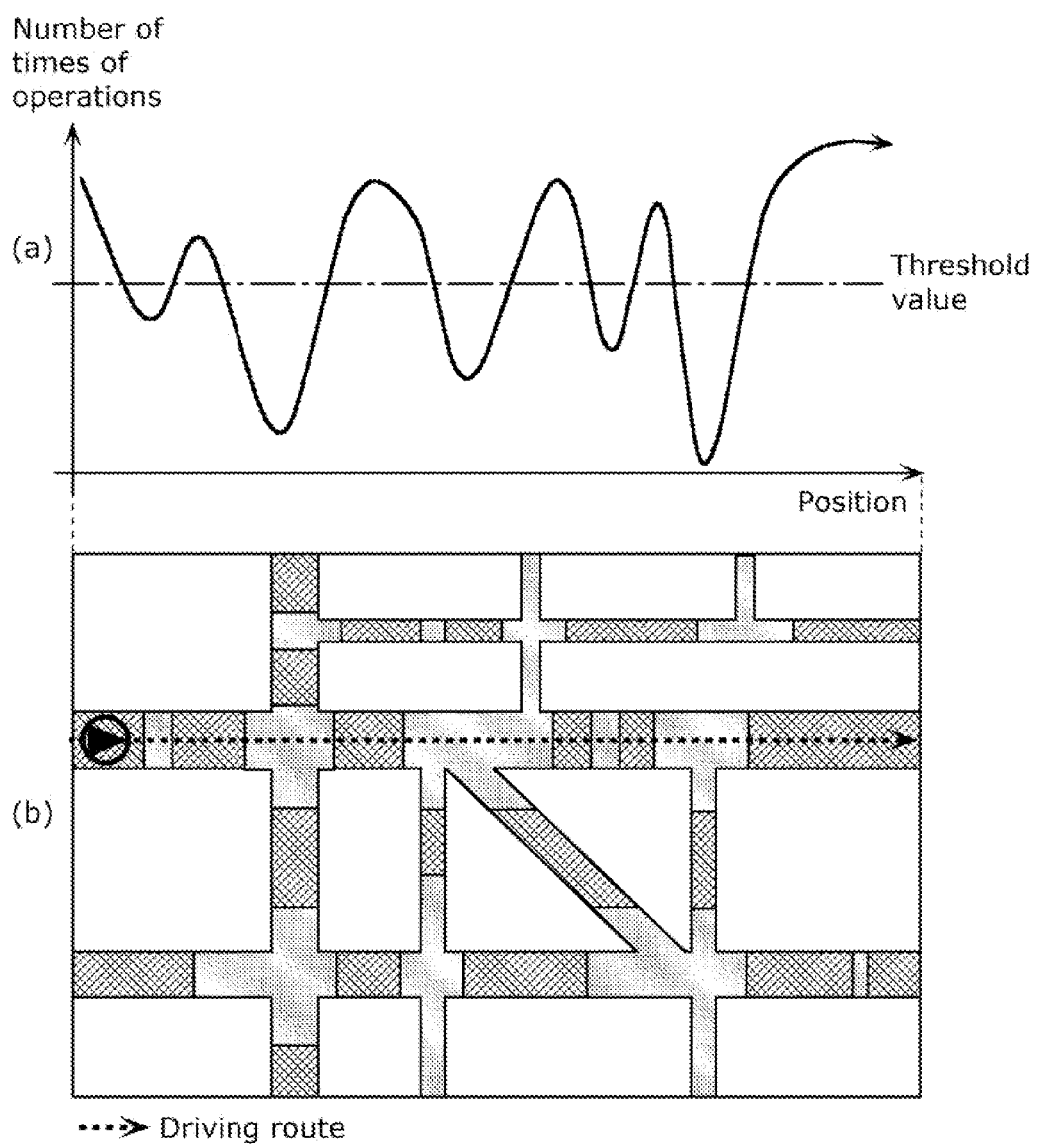
FIG. 11 is an illustration presenting a relationship between the number of times of operations and map information presented by operation information according to this embodiment.

FIG. 11 is an illustration presenting a relationship between the number of times of operations and map information d2 presented by operation information d1.

As illustrated in (a) of FIG. 11 as an example, the number of times of operations at each of positions along a predetermined route on the map is presented by the operation information d1. The determining unit 320 determines that information presentation to the user by the wireless terminal 1100 is allowed at each of the positions having the number of times of operations that is larger than the predetermined threshold value. Stated differently, the determining unit 320 determines, for each position on the map, that information presentation is allowed when the frequency at the position indicated by the operation information d1 is higher than the threshold value. On the other hand, the determining unit 320 determines that information presentation to the user by the wireless terminal 1100 is prohibited at each of the positions having the number of times of operations that is lower than or equal to the predetermined threshold value. As a result, as illustrated in (b) of FIG. 11, the map information d2 indicates the result of the determination at each position along the dot-line arrow showing the predetermined route. In (b) of FIG. 11 as in each of FIGS. 10A and 10B, parts hatched with dots present presentation prohibited areas, and parts hatched with oblique lines present presentation allowed areas.

Figure 12:
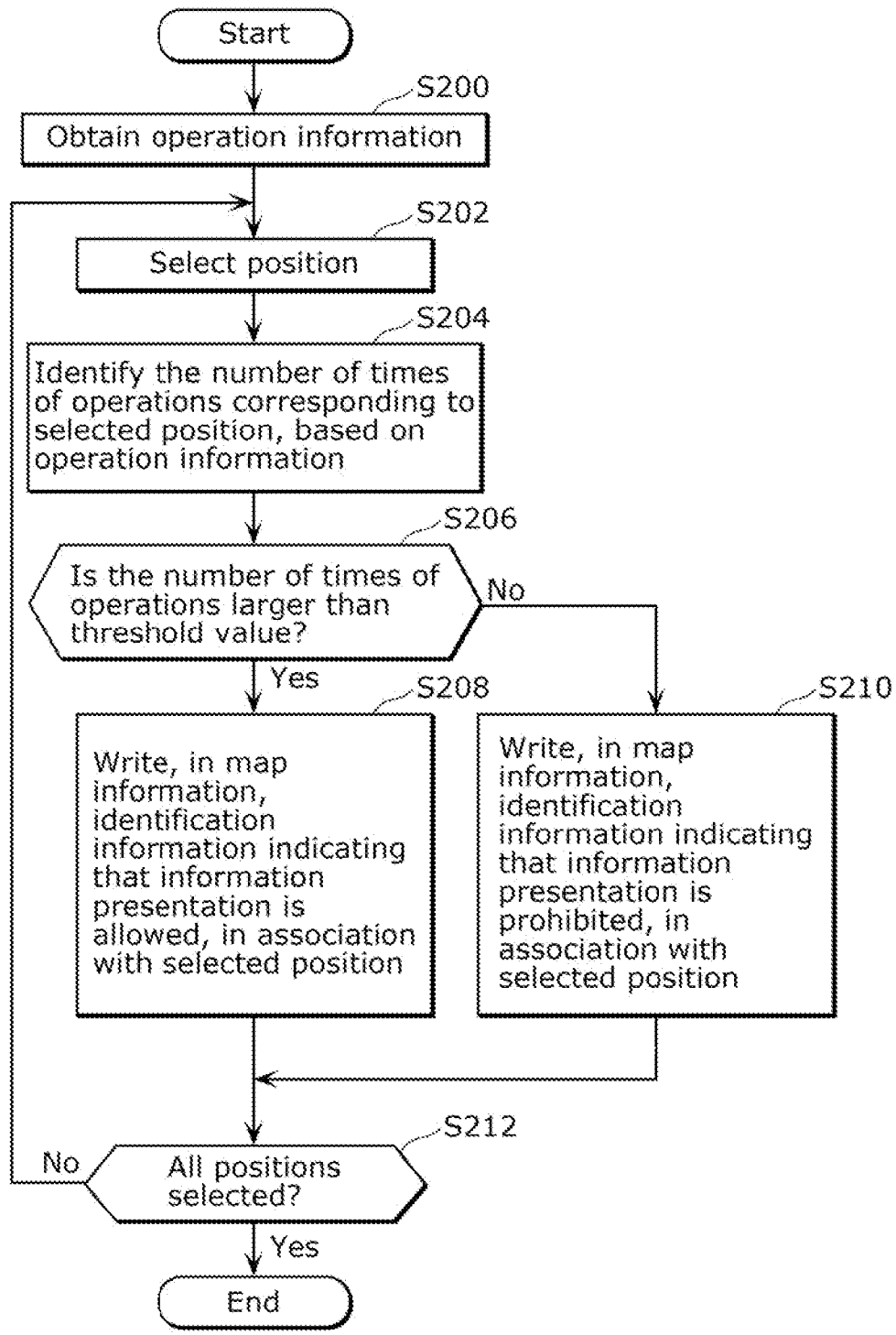
FIG. 12 is a flowchart of processing operations performed by a map information creation device according to the embodiment.

FIG. 12 is a flowchart of processing operations performed by the map information creation device 300.

First, the information obtaining unit 310 obtains the operation information d1 from the information storage device 100 of each wireless terminal 1100 (Step S200). Next, the determining unit 320 selects the position on the route on the map (Step S202), and identifies the number of times of operations associated with the selected position, based on the operation information d1 obtained in Step S200 (Step S204). For example, when only one selected position is included in the positions indicated by pieces of operation information d1, the determining unit 320 identifies the number of times of operations associated with the position. When two or more selected positions are (or a position selected twice or more is) included in the positions indicated by the pieces of operation information d1, the determining unit 320 identifies the total sum of the numbers of times of operations associated with the two or more positions. When the selected position is not included in the positions, the determining unit 320 identifies, for example, "0" or "a value larger than the predetermined threshold value" as the number of times of operations associated with the position.

Here, the determining unit 320 determines whether or not the number of times of operations is larger than the threshold value (Step S206). When the determining unit 320 determines that the number of times of operations is larger than the threshold value (Yes in Step S206), the creating unit 330 writes the identification information "allowed" to the map information d2 in association with the selected position (Step S208). On the other hand, when the determining unit 320 determines that the number of times of operations is smaller than or equal to the threshold value (No in Step S206), the creating unit 330 writes the identification information "prohibited" to the map information d2 in association with the selected position (Step S210).

The determining unit 320 determines whether or not all of positions on the route on the map have been selected (Step S212). Here, when the determining unit 320 determines that all of the positions on the route on the map have been selected (Yes in Step S212), the determining unit 320 terminates the processing for creating the map information d2. On the other hand, when the determining unit 320 determines that not all of the positions on the route on the map have been selected (No in Step S212), the determining unit 320 repeatedly executes the processing from Step S202.

In this way, the map information creation device 300 according to this embodiment determines, for each position on the map, whether or not information presentation is allowed at the position based on a history record (a piece of operation information d1) indicating the frequency of operations performed on the device by the user when the movable body is at the position, and creates the map information d2 indicating the result of the determination. As a result, the map information d2 can indicate whether or not the information presentation is allowed at each position, based on the user state or load identified based on the frequency of operations at the position. Accordingly, the use of the map information d2 like this makes it possible to present arbitrary information at a right time for the user state or load, irrespective of whether a nearby landmark is present.

In the case where the movable body moves when the user drives and the frequency of operations indicated by the operation information is the frequency of operations unrelated to the driving, the driving load on the user is small at the position at which the frequency is higher than the threshold value. Accordingly, map information indicating that the information presentation is allowed at the position is created, it is possible to present presentable information at a right time when the user load is small, stated differently, at the right time when the user can afford to pay attention to the presentable information.

Figure 13:
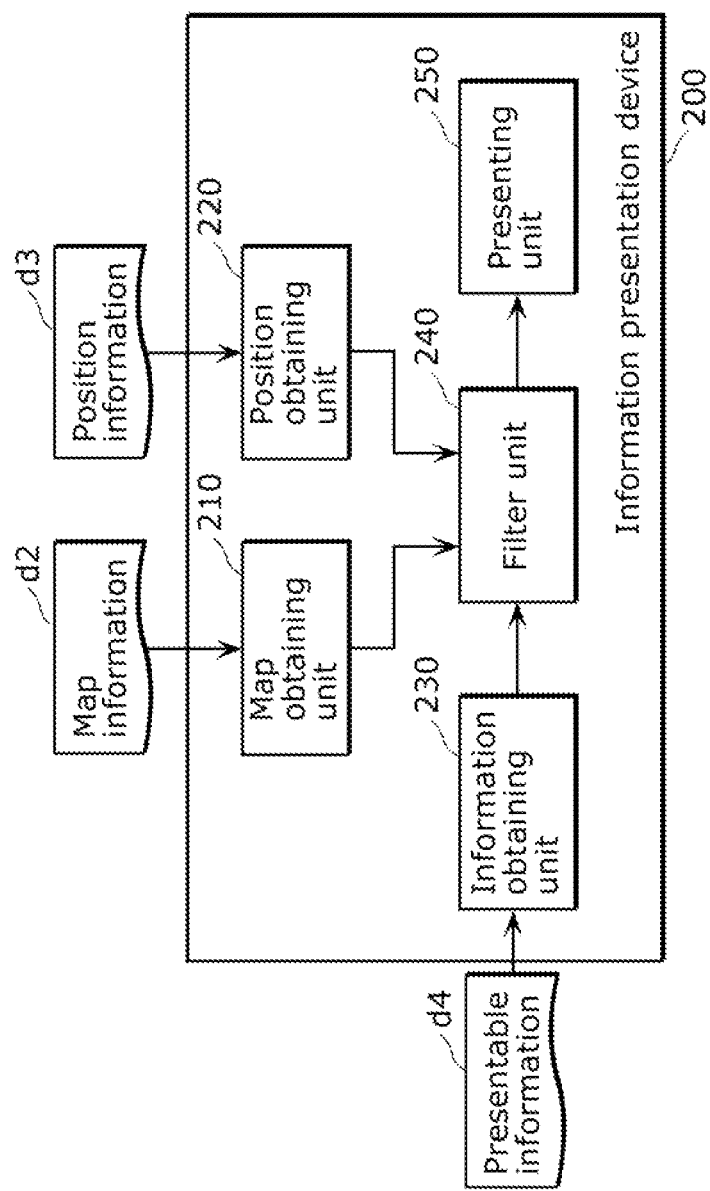
FIG. 13 is a block diagram illustrating a configuration of an information presentation device according to the embodiment.

FIG. 13 is a block diagram illustrating a configuration of the information presentation device 200.

The information presentation device 200 includes a map obtaining unit 210, a position obtaining unit 220, an information obtaining unit 230, a filter unit 240, and a presenting unit 250.

The map information obtaining unit 210 obtains the map information d2 from the map information creation device 300 of the server 2000, and outputs it to the filter unit 240. The position obtaining unit 220 obtains the position information d3 at, for example, a predetermined cycle and outputs it to the filter unit 240, in the same manner as the position obtaining unit 110 of the information storage device 100. The information obtaining unit 230 obtains presentable information d4 that is for presentation to the user of the wireless terminal 1100, and outputs it to the filter unit 240. The information obtaining unit 230 may obtain the presentable information d4 via the communication network 3000 such as the Internet or a local storage. Alternatively, the information obtaining unit 230 may create, as the presentable information d4, information for invoking attention of the user based on the state of the movable body or the user, and obtain the presentable information d4.

The filter unit 240 is configured as a determining unit. When obtaining the presentable information d4 from the information obtaining unit 230, the filter unit 240 determines whether or not to present the presentable information d4 to the user. In making the determination, the information obtaining unit 230 uses the map information d2 and the position information d3. The filter unit 240 outputs the presentable information d4 to the presenting unit 250 when determining to present the presentable information d4 to the user, and prohibits output of the presentable information d4 to the presenting unit 250 when determining not to present the presentable information d4 to the user. When obtaining the presentable information d4 from the filter unit 240, the presenting unit 250 presents the presentable information d4 to the user using at least one of an image and a sound. In other words, the presenting unit 250 presents the presentable information d4 to the user, by outputting the presentable information d4 in the form of the image or the sound from the output unit that is at least one of the display 14 and the speaker 15 provided in the wireless terminal 1100.

For example, the presentable information d4 is the area information created by the server 2000 or the message of "Do you turn ON air conditioner?" created by the controller. The presenting unit 250 may include an output device such as a display and a speaker, and may cause the output device to output the presentable information d4 in the form of the image or the sound. Alternatively, the presenting unit 250 may cause the presentable information d4 to be output in the form of the image or the sound from a device (output unit) that is not the output device and is for example the instrument panel 1200 or the head-up display.

Figure 14:
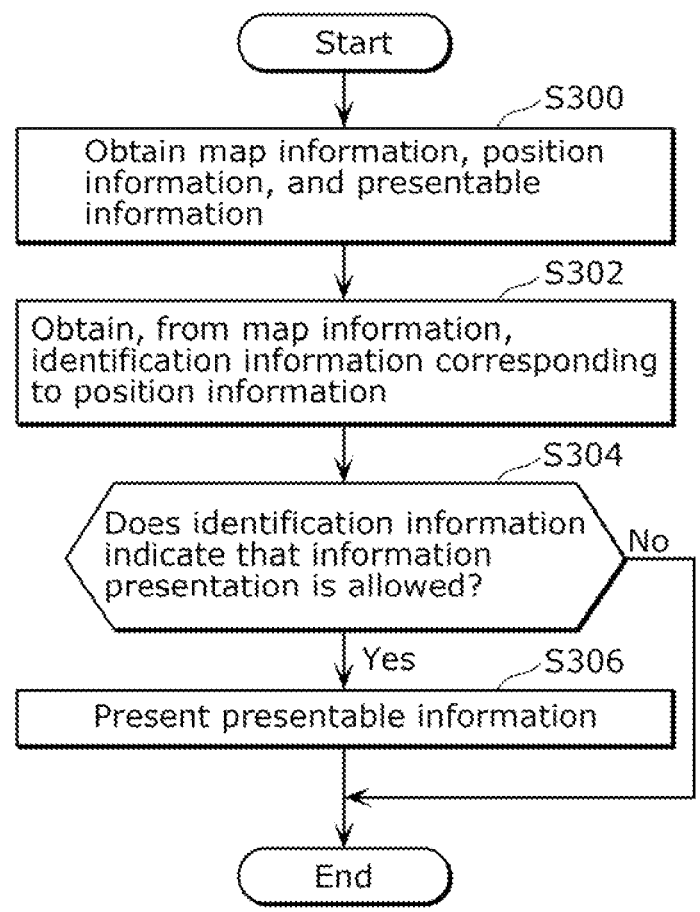
FIG. 14 is a flowchart of processing operations performed by the information presentation device according to the embodiment.

FIG. 14 is a flowchart of processing operations performed by the information presentation device 200.

First, the map obtaining unit 210, the position obtaining unit 220, and the information obtaining unit 230 obtain the map information d2, the position information d3, and the presentable information d4, respectively (Step S300). These kinds of information may be obtained at the same time or at different times. Each of the map obtaining unit 210, the position obtaining unit 220, and the information obtaining unit 230 outputs the obtained information to the filter unit 240.

When the presentable information d4 is obtained by the information obtaining unit 230, the filter unit 240 obtains, from the map information d2, the identification information associated with a current position of the wireless terminal 1100 indicated by the latest position information d3 at that time (Step S302). Next, the filter unit 240 determines whether or not the identification information indicates "allowed", specifically, that the information presentation is allowed (Step S304). In other words, the filter unit 240 determines whether or not to present the obtained presentable information d4 to the user at the current position indicated by the position information d3.

Here, when the filter unit 240 determines that the identification information indicates "allowed", stated differently, determines to present the presentable information d4 to the user, the presenting unit 250 obtains the presentable information d4 from the filter unit 240, and presents the presentable information d4 to the user (Step S306). On the other hand, when the filter unit 240 determines that the identification information indicates "prohibited", stated differently, determines not to present the presentable information d4 to the user, the filter unit 240 prohibits output of the presentable information d4 to the presenting unit 250. As a result, the presenting unit 250 does not obtain the presentable information d4 from the filter unit 240, and does not present the presentable information d4 at the current position.

In the case where the position information d3 is updated when the car 1000a and the wireless terminal 1100 move to a new current position, the filter unit 240 determines whether or not to present the presentable information d4 to the user at the new current position, based on the updated new position information d3. When the filter unit 240 determines to present, to the user, the presentable information d4 which has been prohibited from being output to the presenting unit 250, the filter unit 240 outputs the presentable information d4 to the presenting unit 250. In this way, it is possible to present the presentable information d4 to the user at the right time when the driving load on the user (user load) is small.

Although the information presentation device 200 according to this embodiment has been described above, the map information d2 in this embodiment indicates a user load by indicating identification information for identifying whether or not the information presentation is allowed at each of the positions of the route on the map. In other words, the information presentation device 200 according to this embodiment is an information presentation device which presents information, including: a map obtaining unit 210 configured to obtain map information d2 indicating a load of the user as a user load required for the user to cause the movable body to pass through each position on a route along which the movable body can be moved on a map; a position obtaining unit 220 configured to obtain position information d3 indicating a position of the movable body; an information obtaining unit 230 configured to obtain presentable information d4; a deciding unit (filter unit 240) configured to identify the user load at the position indicated by the position information d3 obtained with reference to the map information d2, and decide whether or not to present the presentable information d4 obtained, based on the identified user load; and a presenting unit 250 configured to present the presentable information d4 by causing an output unit to output the presentable information d4 when the deciding unit decides that the presentable information d4 is presented.

In this way, whether or not the presentable information is presented is decided based on the user load. Thus, it is possible to present the presentable information d4 at the right time for the user load, irrespective of whether or not a nearby landmark is present.

In other words, the map obtaining unit 210 obtains the map information d2 indicating the user load for each position on the route, by indicating the identification information for identifying whether the information presentation is allowed. The map information d2 indicates a small user load by indicating the identification information which identifies that the information can be presented, and a large user load by indicating the identification information which identifies that the information cannot be presented. In this case, the filter unit 240 that is the deciding unit identifies the identification information at the position indicated by the position information d3 obtained with reference to the map information d2, and, when the identification information determined identifies that the information can be presented, decides that the presentable information d4 obtained is presented.

In this way, the identification information for identifying whether or not the information presentation is allowed is indicated in the map information d2. Thus, it is possible to present the presentable information d4 at a precisely right time.

In other words, for each of the positions passed through by the movable body, the map obtaining unit 210 indicates the identification information for identifying that the presentable information can be presented when the frequency of operations on the device by the user performed when the movable body is at the position is higher than the threshold value, and obtains the map information d2 indicating the identification information for identifying that the presentable information cannot be presented when the frequency of operations on the device by the user performed when the movable body is at the position is lower than or equal to the threshold value. In this way, it is possible to present the presentable information d4 at the time when the user can afford to pay attention to the presentable information d4 and the number of times of operations on the device increases.

(Variation)

The map information creation device 300 according to the above embodiment creates the map information d2 in which identification information is shown in association with positions only. However, a map information creation device according to this variation creates map information showing identification information further in association with data other than the positions. Stated differently, an information storage device according to this variation creates operation information in which each number of times of operations is associated with a position and other data. Furthermore, the information presentation device according to this variation decides whether or not to present presentable information d4 to a user, based not only on the position but also the other data. The other data are, for example, a travelling direction (moving direction) of a car 1000a and a wireless terminal 1100.

Figure 15:
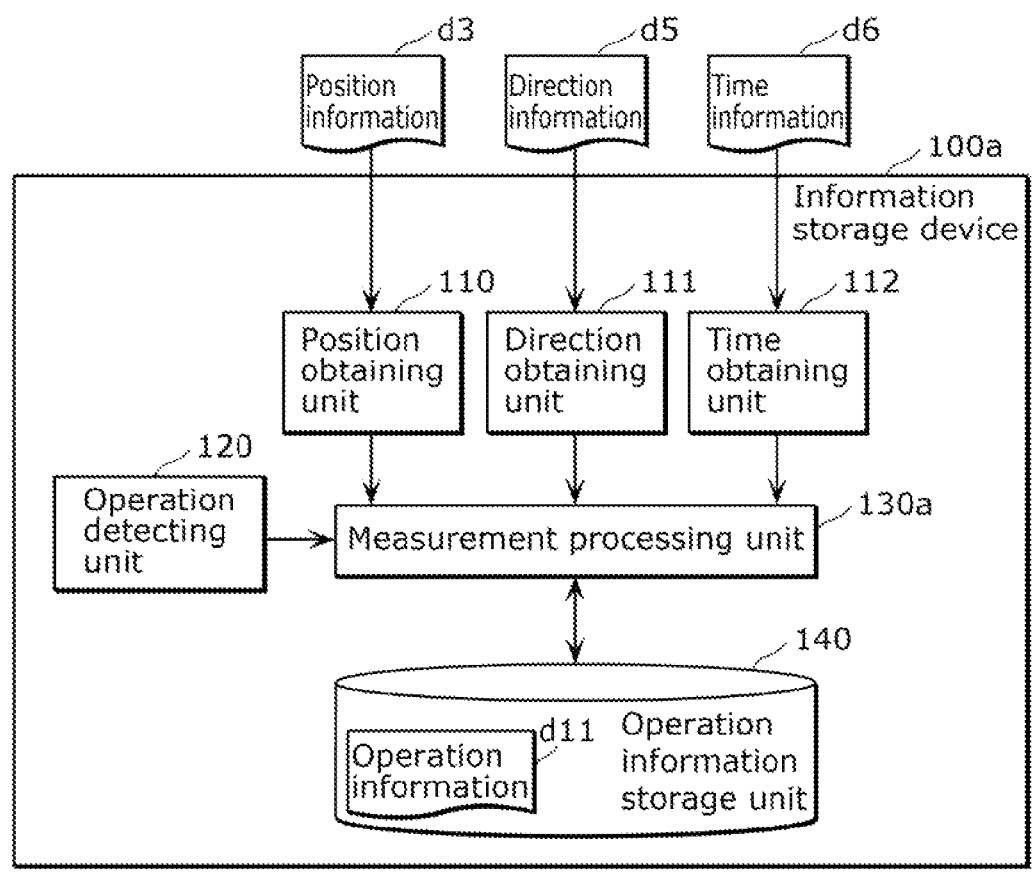
FIG. 15 is a block diagram illustrating a configuration of the information storage device according to a variation of the embodiment.

FIG. 15 is a block diagram illustrating a configuration of an information storage device 100a according to this variation.

The information storage device 100a includes a position obtaining unit 110, a direction obtaining unit 111, a time obtaining unit 112, an operation detecting unit 120, a measurement processing unit 130a, and an operation information storage unit 140.

As described earlier, the position obtaining unit 110 obtains position information d3 that is information indicating a current position of the wireless terminal 1100 at, for example, a predetermined cycle, and outputs the obtained position information d3 to the measurement processing unit 130a.

The direction obtaining unit 111 obtains direction information d5 that is information indicating a current travelling direction of the wireless terminal 1100 at, for example, a predetermined cycle. In addition, the position information d5 is created through, for example, processing using a global positioning system (GPS) performed by the terminal processing unit 12. The direction obtaining unit 111 outputs the obtained direction information d5 to the measurement processing unit 130a.

The time obtaining unit 112 obtains time information d6 that is information indicating a current time at, for example, a predetermined cycle. In addition, this time information d6 is created by a clock provided in, for example, the terminal processing unit 12. The time obtaining unit 112 outputs the obtained time information d6 to the measurement processing unit 130a.

The operation detecting unit 120 detects an operation on the device performed by the user. The operation detecting unit 120 notifies the result of the detection to the measurement processing unit 130a.

The operation information storage unit 140 stores operation information d11 indicating, for each of combinations of one of positions, one of travelling directions, and one of time zones, the combination and the number of times of operations (operation times) performed by the user in the situation indicated by the combination. The above combination is hereinafter simply referred to as a set.

When the measurement processing unit 130a receives the position information d3, the direction information d5, and the time information d6 respectively from the position obtaining unit 110, the direction obtaining unit 111, and the time obtaining unit 112, the measurement processing unit 130a obtains the results of the detections by the operation detecting unit 120 at that time. Furthermore, the measurement processing unit 130a reads the operation information d11 from the operation information storage unit 140. The measurement processing unit 130a determines whether or not the set of the position indicated by the position information d3, the travelling direction indicated by the direction information d5, and the time zone including the time indicated by the time information d6 has already been written in the operation information d11. Furthermore, the measurement processing unit 130a determines whether or not a user operation was detected or not, in other words, the user made the operation, based on the results of the detections obtained by the operation detecting unit 120. The measurement processing unit 130a executes processing below based on the results of the determinations.

More specifically, when the set was already written in the operation information d11 and the user operation was detected, the measurement processing unit 130a increments (counts up) the number of times of operations associated with the set in the operation information d11. The measurement processing unit 130a updates, to the counted number of times of operations, the number of times of operations associated with the set in the operation information d11 stored in the operation information storage unit 140. When the set was already written in the operation information d11 and no corresponding user operation was detected, the measurement processing unit 130a terminates the processing without modifying the operation information d11.

On the other hand, when the set was not yet written in the operation information d1 and a user operation was detected, the measurement processing unit 130a writes, in an associated manner, the set and "1" that is the number of times of operations in the operation information d11 stored in the operation information storage unit 140. In addition, when the set was not written in the operation information d1 and no corresponding user operation was detected, the measurement processing unit 130a writes, in an associated manner, the set and "0" that is the number of times of operations in the operation information d11 stored in the operation information storage unit 140.

FIG. 16 is a diagram illustrating examples of details of operation information d11 according to this variation.

As illustrated in FIG. 16, the operation information d11 shows, for each set of a position, a travelling direction, and a time zone, the set and the number of times of operations (operation times) performed in a situation indicated by the set in an associated manner. For example, the operation information d11 indicates a set of longitude of "135.577" and latitude of "34.756", a travelling direction of "Northeast", and a time zone of "8:00", and also indicates "1596" as the number of times of operations in association with the set. The operation information d11 is sequentially updated by the measurement processing unit 130a. In addition, the measurement processing unit 130a transmits the operation information d11 stored in the operation information storage unit 140 to the server 2000 via the terminal communication unit 13 of the wireless terminal 1100, for example, in response to a request from the server 2000 or at a predetermined cycle.

Figure 17:
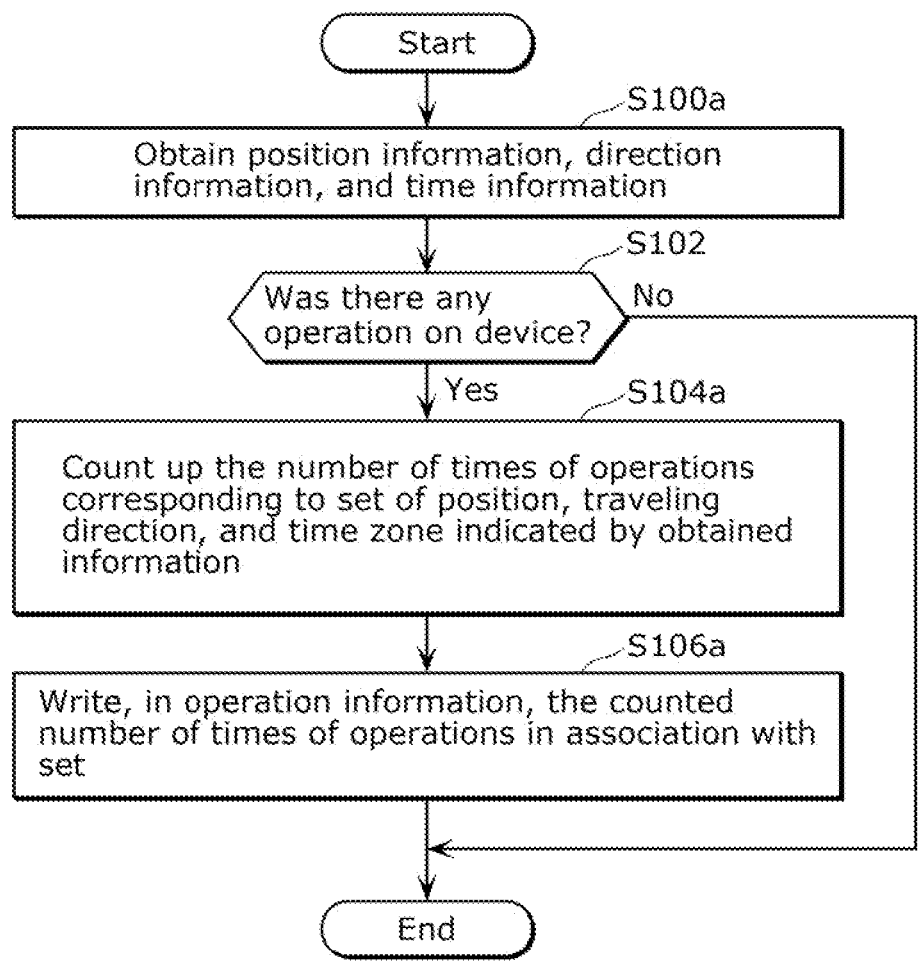
FIG. 17 is a flowchart of processing operations performed by an information storage device according to the variation of the embodiment.

FIG. 17 is a flowchart of processing operations performed by the information storage device 100a according to this variation. To simplify illustration, FIG. 17 indicates a processing operation performed when the set indicated by the position information d3, the direction information d5, and the time information d6 was already in the operation information d11 stored in the operation information storage unit 140.

First, the position obtaining unit 110, the direction obtaining unit 111, and the time obtaining unit 112 obtain the position information d3, the direction information d5, and the time information d6, respectively (Step S100a). Next, the measurement processing unit 130a determines whether or not there was a user operation on the device performed by the user, based on the result of the detection by the operation detecting unit 120 (Step S102). Here, upon determining that there was the operation (Yes in Step S102), the measurement processing unit 130a searches the operation information d11 for the set including the position indicated by the position information d3, the direction information d5, and the time information d6, the travelling direction, and the time zone. Subsequently, the measurement processing unit 130a reads the number of times of operations associated with the set in the operation information d11, and counts up the number of times of operations (Step S104a). The measurement processing unit 130a updates, to the counted number of times of operations, the number of times of operations associated with the set in the operation information d11 stored in the operation information storage unit 140 (Step S106a). On the other hand, when it is determined that there was not such an operation in Step S102 (No in Step S102), the information storage device 100a terminates the processing on the obtained position information d3, direction information d5, and time information d6.

As described above, when the set including the position indicated by the position information d3, the direction information d5, and the time information d6, and the others is not included in the operation information d11, the measurement processing unit 130a writes the set and either "1" or "0" as the number of times of operations in the operation information d11 in an associated manner.

The map information creation device 300 according to this variation has the same configuration as that of the map information creation device 300 according to the above embodiment. Thus, map information creation device 300 according to this variation basically performs processing in the same manner as the map information creation device 300 according to the above embodiment, but performs differently in some details of processing.

Figure 18:
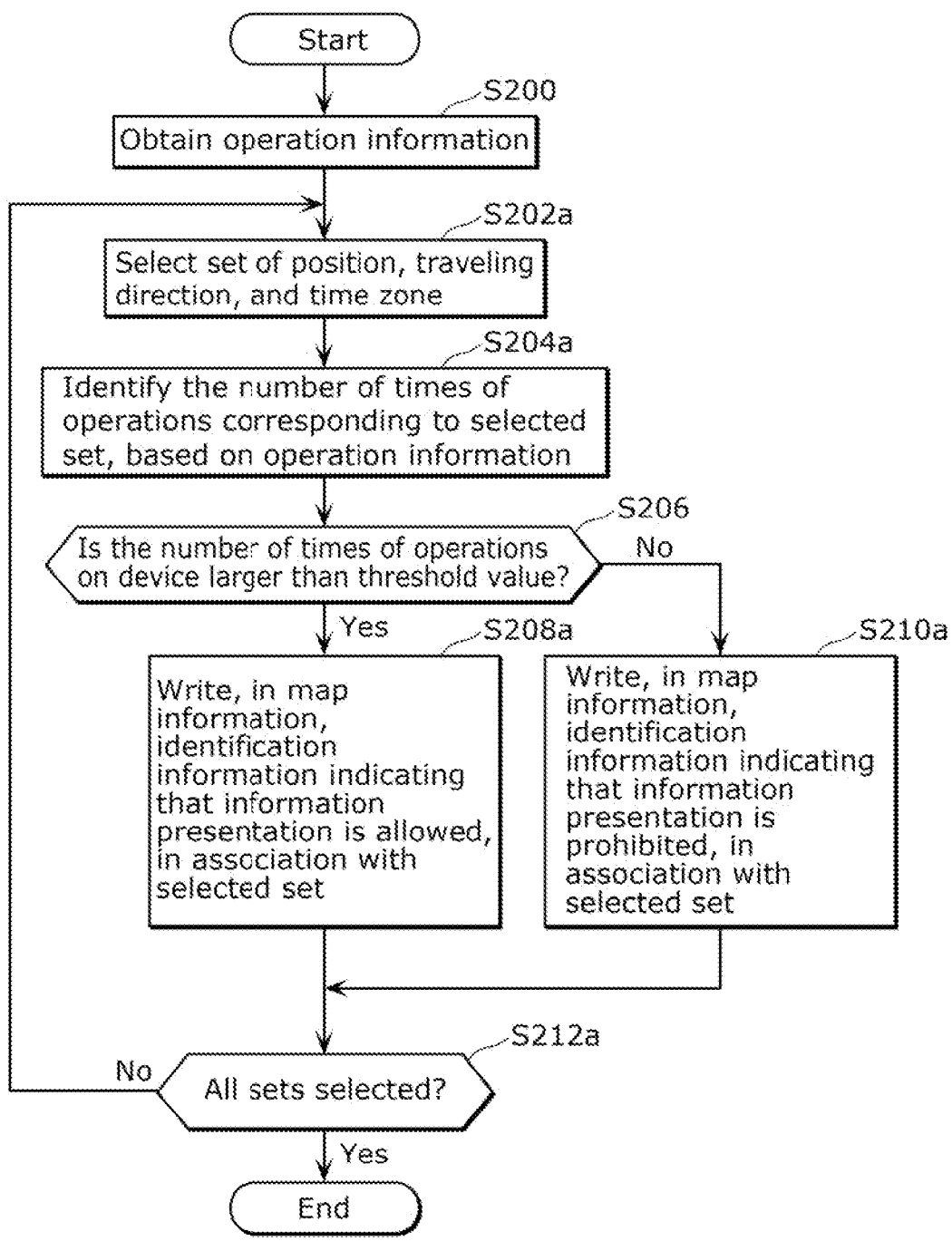
FIG. 18 is a flowchart of processing operations performed by a map information creation device according to the variation of the embodiment.

FIG. 18 is a flowchart of processing operations performed by the map information creation device 300 according to this variation.

First, the operation obtaining unit 310 obtains the operation information d11 from the information storage device 100a of each wireless terminal 1100 (Step S200). Next, the determining unit 320 selects a set of a position on the route of the map, a travelling direction from the position, and a time zone (Step S202a), and identifies the number of times of operations corresponding to the selected set, with reference to the operation information d11 obtained in Step S200 (Step S204a). The specific process in Step S204a is similar to Step S204 illustrated in FIG. 12, and is performed using the set instead of the position in Step S204.

Here, the determining unit 320 determines whether or not the number of times of operations is higher than the threshold value (Step S206). When the determining unit 320 determines that the number of times of operations is larger than the threshold value (Yes in Step S206), the creating unit 330 writes the identification information "allowed" to the map information in association with the selected set (Step S208a). On the other hand, when the determining unit 320 determines that the number of times of operations is smaller than or equal to the threshold value (No in Step S206), the creating unit 330 writes the identification information "prohibited" to the map information in association with the selected set (Step S210a).

The determining unit 320 determines whether or not all of sets of positions on the route on the map, travelling directions from the position, and time zones have already been selected (Step S212a). Here, when the determining unit 320 determines that all of the sets have been selected (Yes in Step S212a), the determining unit 320 terminates the processing for creating the map information. On the other hand, when the determining unit 320 determines that not all of the sets have been selected (No in Step S212a), the determining unit 320 repeatedly executes the processing from Step S202a.

FIG. 19 is a diagram illustrating examples of details of map information according to this variation.

The map information d12 indicates, for each of sets of one of the positions, one of the travelling directions, and one of the time zones, the set and identification information corresponding to the set. The identification information is information for identifying whether or not information presentation is allowed. For example, the map information d12 indicates a set of longitude of "135.577" and latitude of "34.756", a travelling direction of "Northeast", and a time zone of "8:00", and also indicates the identification information of "allowed" in association with the set.

In this variation, for each of the combinations of the positions passed through by the movable body, the moving directions of the movable body from the position, and the time zones in which the movable body passed through the position, the operation information d11 indicates the frequency of the operations performed on the device by the user in the situation indicated by the combination. For each of the combinations of the positions on the map, the directions, and the time zones, the determining unit 320 of the map information creation device 300 according to this variation determines whether or not information presentation is allowed, based on the frequency corresponding to the combination indicated by the operation information d11. The creating unit 330 creates the map information d12 indicating, for each combination, map information d12 indicating the result of the determination by the determining unit 320.

In this way, map information d12 indicating the determination result for each combination of the positions on the map, the directions, and the time zones is created, which makes it possible to present the information to the user at a preferable time.

Figure 20:
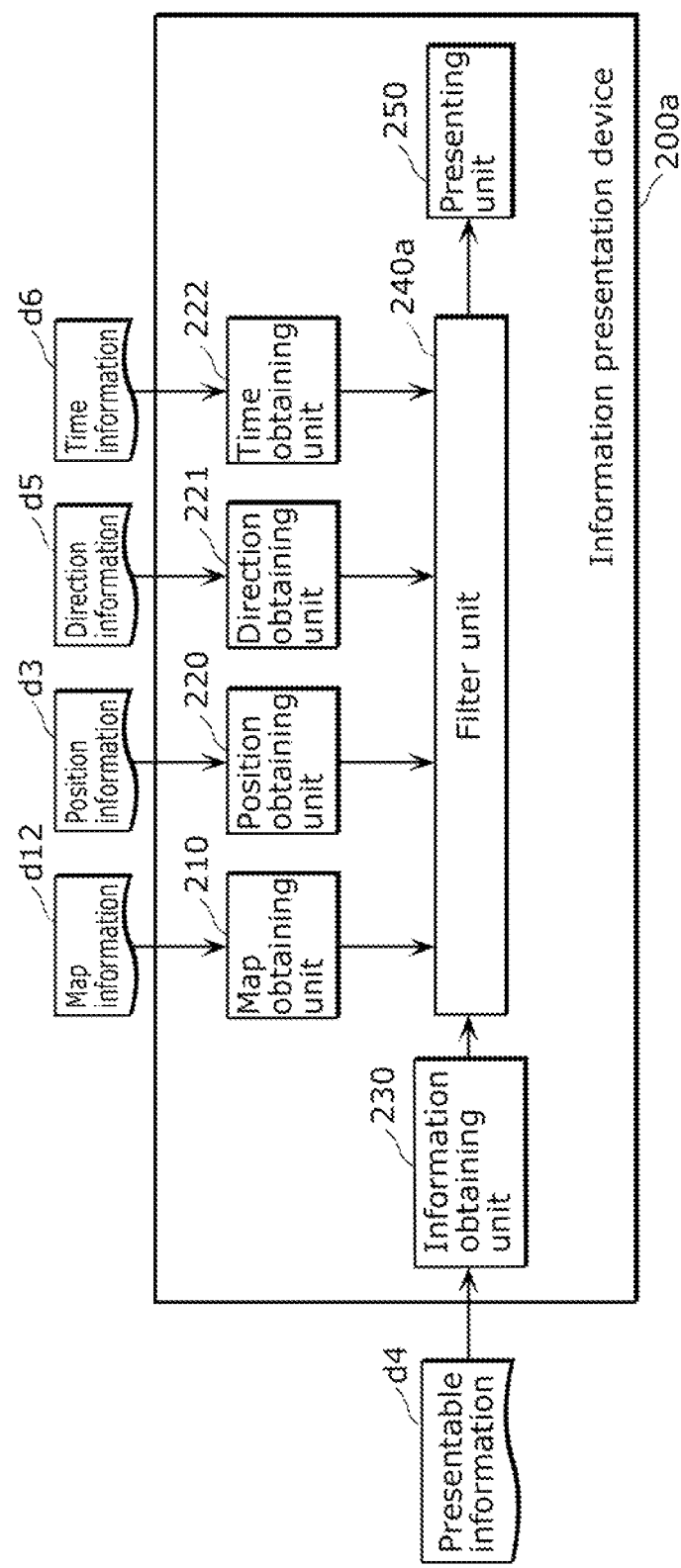
FIG. 20 is a block diagram illustrating a configuration of the information presentation device according to a variation of the embodiment.

FIG. 20 is a block diagram illustrating a configuration of an information presentation device 200a according to the variation.

The information presentation device 200a includes a map obtaining unit 210, a position obtaining unit 220, a direction obtaining unit 221, a time obtaining unit 222, an information obtaining unit 230, a filter unit 240a, and a presenting unit 250.

The map obtaining unit 210 obtains the map information d12 from the map information creation device 300 of the server 2000, and outputs it to the filter unit 240a. The position obtaining unit 220 obtains the position information d3, and outputs it to the filter unit 240a. The direction obtaining unit 221 obtains the direction information d5, and outputs it to the filter unit 240a. The time obtaining unit 222 obtains the time information d6, and outputs it to the filter unit 240a. The information obtaining unit 230 obtains the presentable information d4 to be presented to the user of the wireless terminal 1100, and outputs it to the filter unit 240a. When obtaining the presentable information d4 from the information obtaining unit 230, the filter unit 240a determines whether or not to present the presentable information d4 to the user. In the determination, the filter unit 240a makes the determination using the map information d12, the position information d3, the direction information d5, and the time information d6.

The filter unit 240a outputs the presentable information d4 to the presenting unit 250 when determining to present the presentable information d4 to the user, and prohibits output of the presentable information d4 to the presenting unit 250 when determining not to present the presentable information d4 to the user. When obtaining the presentable information d4 from the filter unit 240a, the presenting unit 250 presents the presentable information d4 to the user using at least one of an image and a sound.

Figure 21:
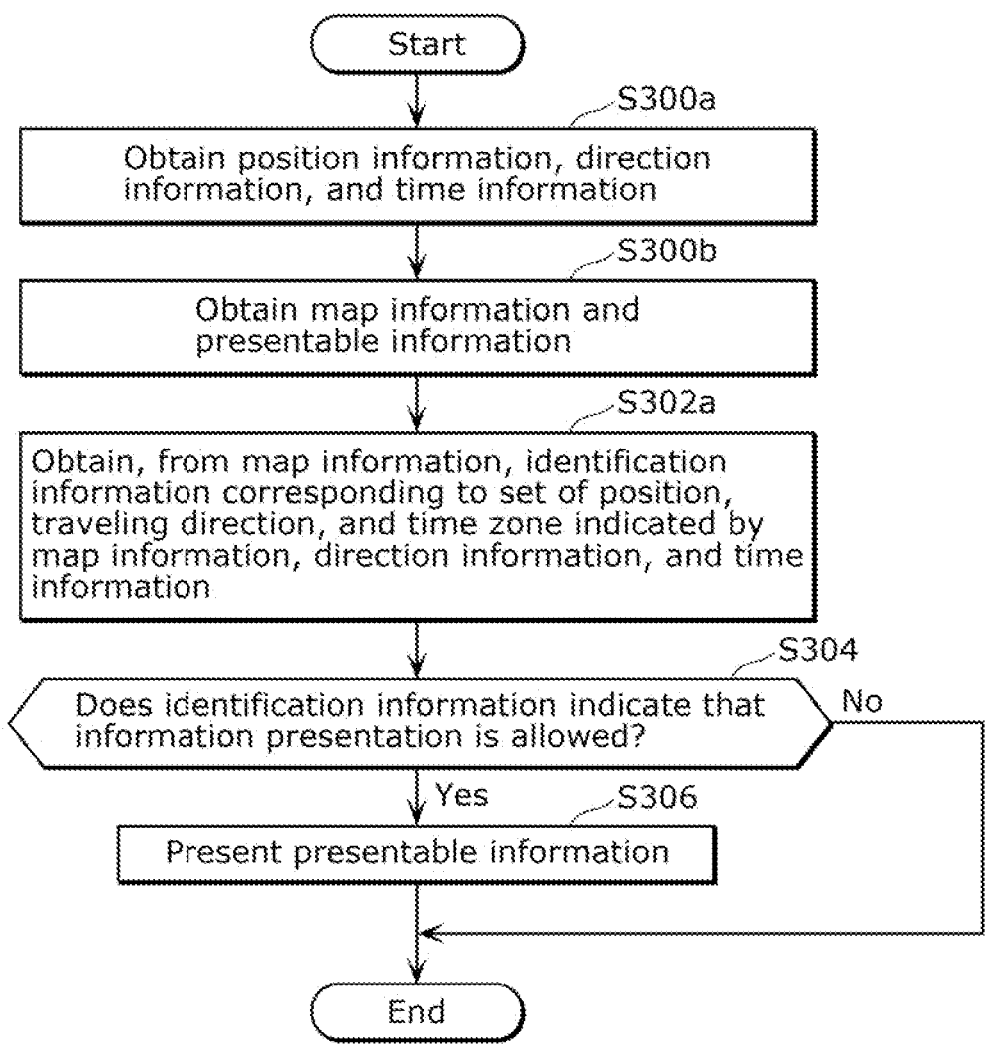
FIG. 21 is a flowchart of processing operations performed by the information presentation device according to the variation of the embodiment.

FIG. 21 is a flowchart of processing operations performed by the information presentation device 200a.

First, the position obtaining unit 220, the direction obtaining unit 221, and the time obtaining unit 222 obtain the position information d3, the direction information d5, and the time information d6, respectively (Step S300a). Furthermore, the map obtaining unit 210 and the information obtaining unit 230 obtain the map information d12 and the presentable information d4, respectively (Step S300b). These kinds of information may be obtained at the same time or at different times. Each of the map obtaining unit 210, the position obtaining unit 220, the direction obtaining unit 221, the time obtaining unit 222, and the information obtaining unit 230 outputs the obtained information to the filter unit 240a.

When the presentable information d4 is obtained by the information obtaining unit 230, the filter unit 240a obtains, with reference to the map information d12, the identification information corresponding to a set including a current position of the wireless terminal 1100 indicated by the latest position information d3 at that time, a travelling direction of the car 1000a indicated by the latest direction information d5 at that time, and a time zone including a time indicated by the latest time information d6 at that time (Step S302a). Next, the filter unit 240a determines whether or not the identification information indicates "allowed", specifically, that the information presentation is allowed (Step S304). In other words, the filter unit 240a determines whether or not to present the obtained presentable information d4 to the user in the situation indicated by the position information d3, the direction information d5, and the time information d6.

Here, when the filter unit 240a determines that the identification information indicates "allowed", stated differently, determines to present the presentable information d4 to the user (Yes in Step S304), the presenting unit 250 obtains the presentable information d4 from the filter unit 240a, and presents the presentable information d4 to the user (Step S306). On the other hand, when the filter unit 240a determines that the identification information indicates "prohibited" (No in Step S304), stated differently, when determines not to present the presentable information d4 to the user, the filter unit 240a prohibits output of the presentable information d4 to the presenting unit 250. As a result, the presenting unit 250 does not obtain the presentable information d4 from the filter unit 240a, and does not present the presentable information d4 in the situation.

When the position information d3, the direction information d5, and the time information d6 have been updated with changes of the current position, the travelling direction, and the time regarding the car 1000a and the wireless terminal 1100, the filter unit 240a determines whether or not to present the presentable information d4 to the user in the situation indicated by the position information d3, the direction information d5, and the time information d6 that have been updated. When the filter unit 240a determines to present, to the user, the presentable information d4 which has been prohibited from being output to the presenting unit 250, the filter unit 240a outputs the presentable information d4 to the presenting unit 250. In this way, it is possible to present the presentable information d4 to the user at the right time when the driving load on the user is small.

In this way, the information presentation device 200a according to this variation further includes a direction obtaining unit 221 which obtains direction information indicating a moving direction of the movable body, and a time obtaining unit 222 which obtains time information indicating a current time, compared to the information presentation device 200 according to the above embodiment. Subsequently, the map obtaining unit 210 obtains the map information d12 indicating identification information for each of combinations of one of positions on the route, one of directions, and one of time zones. The filter unit 240a which is a deciding unit which identifies, with reference to the map information d12, the identification information associated with the combination of the position indicated by the obtained position information d3, the direction indicated by the obtained direction information d5, and the time indicated by the obtained time information d6, and when the identified identification information identifies that the information presentation is allowed, decides to present the obtained presentable information d4.

In this way, it is possible to present the presentable information at a right time for the position of the movable body, the moving direction of the movable body, and the current time.

In the system according to this variation, the combination of the position, direction (travelling direction), and time (time zone) is used. However, a combination of a position and a direction only, or a combination of a position and a time only may be used.

In other words, for each of combinations of the positions passed through by the movable body and the moving directions of the movable body from the position, the operation information indicates the frequency of operations performed on the device by the user in the situation indicated by the combination. In this case, for each of the combinations of the positions on the map and the directions, the determining unit 320 of the map information creation device 300 determines whether or not information presentation is allowed based on the frequency corresponding to the combination indicated by the operation information. Subsequently, the creating unit 330 creates, for each combination, map information indicating the result of the determination by the determining unit 320. In this variation, the information presentation device 200a further includes a direction obtaining unit 221 which obtains direction information d5 indicating a moving direction of the movable body, compared to the information presentation device 200 according to the embodiment. The map obtaining unit 210 obtains map information indicating the identification information for each of combinations of one of positions on the route and one of directions. The filter unit 240a identifies, with reference to the map information, the identification information associated with the combination of the position indicated by the obtained position information d3 and the direction indicated by the obtained direction information d5, and decides to present the obtained presentable information d4 when the identified identification information identifies that the information presentation is allowed.

In other words, for each of the combinations of the positions passed through by the movable body and the time zones in which the movable body passed through the position, the operation information indicates the frequency of operations performed on the device by the user in the situation indicated by the combination. In this case, for each of the combinations of the positions on the map and the time zones, the determining unit 320 of the map information creation device 300 determines whether or not information presentation is allowed based on the frequency corresponding to the combination indicated by the operation information. Subsequently, the creating unit 330 creates, for each combination, map information indicating the result of the determination by the determining unit 320. In this variation, the information presentation device 200a further includes a time obtaining unit 222 which obtains time information indicating a current time, compared to the information presentation device 200 according to the embodiment. The map obtaining unit 210 obtains the map information indicating identification information for each of the combinations of the positions on the route and the time zones. The filter unit 240a identifies, with reference to the map information, the identification information associated with the combination of the position indicated by the obtained position information d3 and the time indicated by the obtained time information d6, and when the identified identification information identifies that the information presentation is allowed, decides to present the obtained presentable information d4.

The system according to an aspect of the present invention has been described above based on the embodiment and the variation, but the present invention is not limited thereto.

For example, the operation information in any of the embodiment and the variation may indicate the details of operations.

FIG. 22 is a diagram illustrating examples of operation information indicating the details of operations.

The operation information d21 indicates, for each position, the position, the number of times of operations (operation times) performed at the position, and the details of the operation performed at the position. The details of the operation include a device on which the operation is made (a target device), the kind of the operation, and specific details of the operation.

For example, the operation information d21 indicates, as the position, longitude of "135.577" and latitude of "34.756", and indicates "2511" as the number of times of operations and the details of the operation in association with the position. The details of the operation include a target device "Navigation device", the kind of the operation "Response to presentation information", and an answer "YES". In other words, the operation information d21 indicates that an operation of giving the navigation device an answer "YES" to information presented from the wireless terminal 1100 that is the navigation device is performed 2511 times at the position (longitude of "135.577" and latitude of "34.756"). The presentation information that is the information presented by the navigation device is, for example, a message of "Do you display nearby facilities?".

In the information storage device 100 which creates such operation information d21, the operation detecting unit 120 identifies the above details of the operation. The measurement processing unit 130 of the information storage device 100 creates the operation information d21 including the details of the identified operation.

The determining unit 320 of the map information creation device 300 determines, for each position on the map, that information presentation by the wireless terminal 1100 to the user is allowed, when, in the operation information d21, the number of times of operations associated with the position is larger than or equal to the threshold value and the answer regarding the operation performed the number of times of the operation is "YES". In other words, the determining unit 320 determines, for each position on the map, that information presentation to the user by the wireless terminal 1100 is prohibited at the position when, in the operation information d21, the answer regarding the operation performed the number of times of the operation is "NO" even when the number of times of operations associated with the position is larger than or equal to the threshold value. As a result, the map information creation device 300 creates map information d2 indicating whether or not the information presentation is allowed, for each of combinations of one of positions on the map and the details (kind) of the operation.

The information presentation device 200 identifies the details (kind) of the operation related to the presentable information d4, and reads out the identification information associated with the set of the position indicated by the position information d3 and the details of the operation in the map information d2. When the identification information indicates "allowed", the information presentation device 200 presents the presentable information d4.

The information storage device 100 which creates the operation information d21 identifies the target device, the kind of the operation, and the answer, as the details of the operation. However, it is also possible to identify information related to another operation without being limited thereto, and include the information to the operation information d21.

In this way, the operation information d21 indicated by FIG. 22 indicates, for each position passed through by the movable body, the position, the details of the operation performed on the device by the user when the movable body is at the position, and the frequency of the same operations. In this case, the determining unit 320 of the map information creation device 300 determines, for each position on the map, whether or not information presentation is allowed, based on the details of the operation and the frequency of the operations at the position indicated by the operation information d21. For example, the determining unit 320 determines that the information presentation is prohibited at a position, when the frequency at the position indicated by the operation information d21 is higher than a threshold value, and the details of the operation at the position indicated by the operation information d21 indicate that the information presentation is prohibited. The filter unit 240 that is the deciding unit of the information presentation device 200 identifies, with reference to the map information, the identification information associated with the combination of the position indicated by the obtained position information d3 and the details of the operation related to the obtained presentable information d4, and when the identified identification information identifies that the information presentation is allowed, decides to present the obtained presentable information d4.

In this way, when the operation information d21 indicates that a high frequency of operations that prohibit information presentation at a certain position, map information indicating that information presentation is prohibited at the position is created. Thus, it is possible to present information at a right time for the situation indicated by a user taste etc.

In addition, in the embodiment and the variation thereof, processing based on the number of times of operations by the driver who is the user is executed, but processing based on the number of times of operations by a person other than the driver may be executed.

FIG. 23 is a diagram illustrating examples of pieces of operation information each indicating the number of times of operations performed by a passenger.

The operation information d31 indicates, for each position, the position and the number of times of operations. Here, the operation information d31 indicates the number of times of operations for each person who performed the operations. In other words, the following numbers of times are indicated: the number of times of operations by the driver, the number of times of operations by a passenger on the passenger seat, the number of times of operations by a passenger on the right rear seat, and the number of times of operations by a passenger on the left rear seat.

In the information storage device 100 which creates the operation information d31, the operation detecting unit 120 detects the operations performed by the driver and the operations performed by each passenger in a distinguishable manner. For example, a passenger-use device including an operation unit which receives an operation, a display for presenting information, and a speaker is provided in front of each passenger. The operation detecting unit 120 of the information storage device 100 detects which one of the operation units of the devices for the passengers is used when each operation was performed. As a result, the measurement processing unit 130 determines whether or not an operation on the device by the user (driver) was performed as in the embodiment, and identifies which one of the passengers performed the operation on the passenger-use device. The measurement processing unit 130 counts up the number of times of operations for each of the persons (the driver and the passengers) on the car 1000a. The information storage device 100 may identify the person who performed the operation through image recognition using a camera and speech recognition using a microphone.

The details of the operation on the device may be, for example, a search operation and a search keyword used at that time. Alternatively, the details may be a web-browsing operation and a home page viewed at that time. In this way, it is possible to know which information was required by the user and where it was.

The map information creation device 300 creates, for each of persons on the car 1000a or the seats thereof, map information corresponding to the person (the seat) using the operation information d31. In this way, the map information creation device 300 creates not map information common to all of the persons but map information different for each person, seat, or an attribute of the person. The information presentation device 200 determines, for each person (seat) whether or not to present presentable information d4. <For example, when the information presentation device 200 determines to present the presentable information d4, the presentable information d4 is presented by at least one of the display and the speaker of the passenger-use device for the right rear seat.

The map information creation device 300 may create map information different for each kind of the movable body or map information different for each purpose (sightseeing or commuting) of using the movable body.

In the embodiment and the variation thereof, processing based on the number of times of operations as the number of times of operations is executed, but processing based on an operation probability may be executed. The operation probability is indicated for each position passed through by the wireless terminal 1100 (car 1000a), and is a result (quotient) of division of the number of times of operations performed when the wireless terminal 1100 is at the position by the number of times by which the wireless terminal 1100 passed through the position.

In other words, for each position passed through by the wireless terminal 1100, the information storage device 100a counts up the number of times of operations as in the embodiment and the variation thereof, and counts up the number of times of passage by which the position was passed through. Dividing the number of times of operations by the number of times of passage results in the operation probability. The information storage device 100 creates the operation information indicating the number of times of operations and the number of times of passage, so that the operation probability is calculated.

Figure 24:
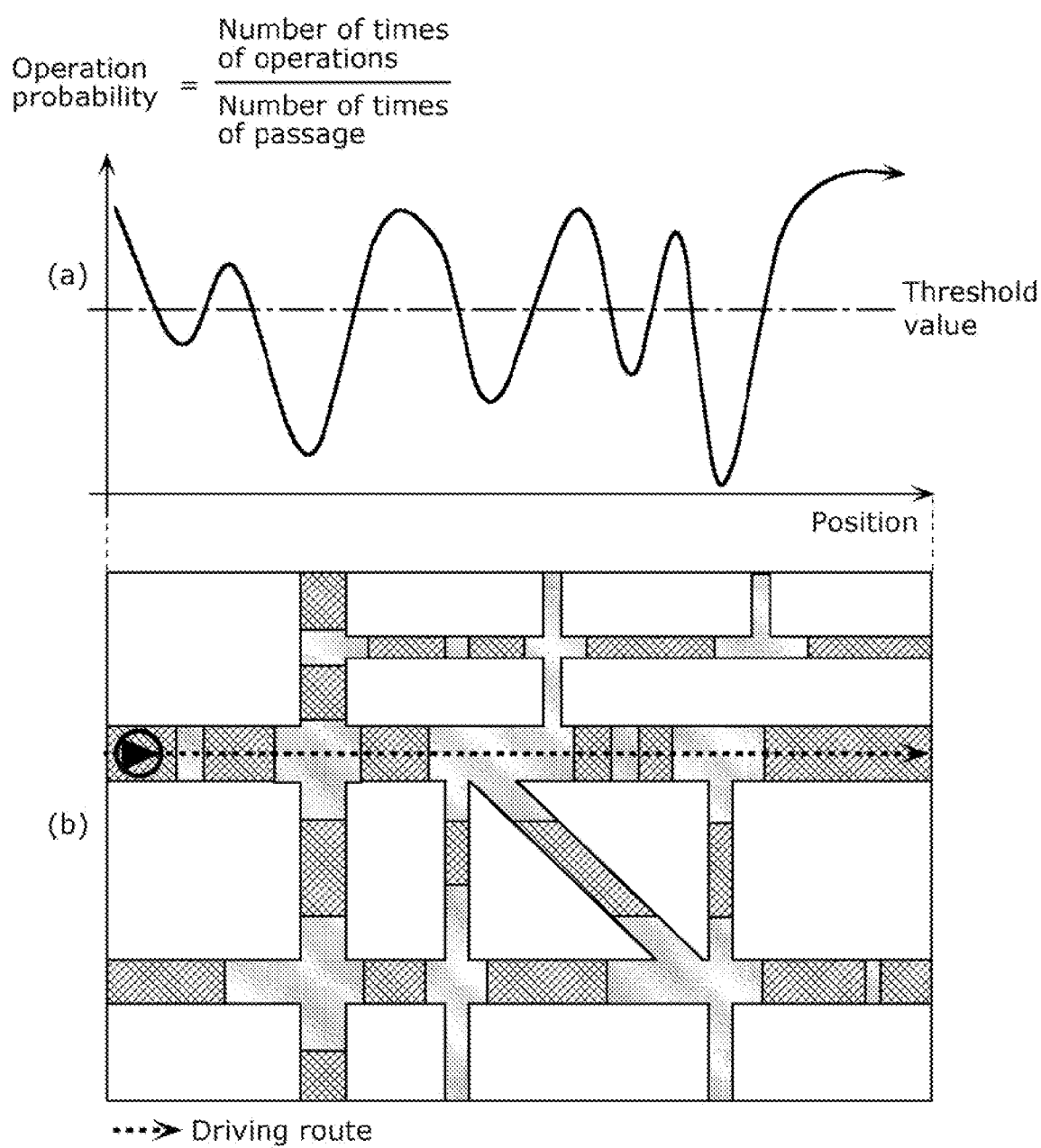
FIG. 24 is an illustration presenting a relationship between the operation probability calculated from operation information and map information according to the variation of this embodiment.

FIG. 24 is an Illustration presenting a relationship between the operation probability calculated from operation information and map information.

For example, as illustrated in (a) of FIG. 24, the operation probability at each position along a predetermined route on the map is calculated based on the number of times of operation and the number of times of passage in the operation information. The determining unit 320 of the map information creation device 300 determines that information presentation to the user by the wireless terminal 1100 is allowed at each of the positions having an operation probability that is higher than a predetermined threshold value. On the other hand, the determining unit 320 determines that information presentation to the user by the wireless terminal 1100 is prohibited at each of the positions having an operation probability that is lower than the predetermined threshold value. As a result, as illustrated in (b) of FIG. 24, the map information d2 indicates the result of the determination at each position along the dot-line arrow showing the predetermined route. In (b) of FIG. 24 as in each of FIGS. 10A and 10B, parts hatched with dots present presentation prohibited areas, and parts hatched with oblique lines present presentation allowed areas.

Figure 25:
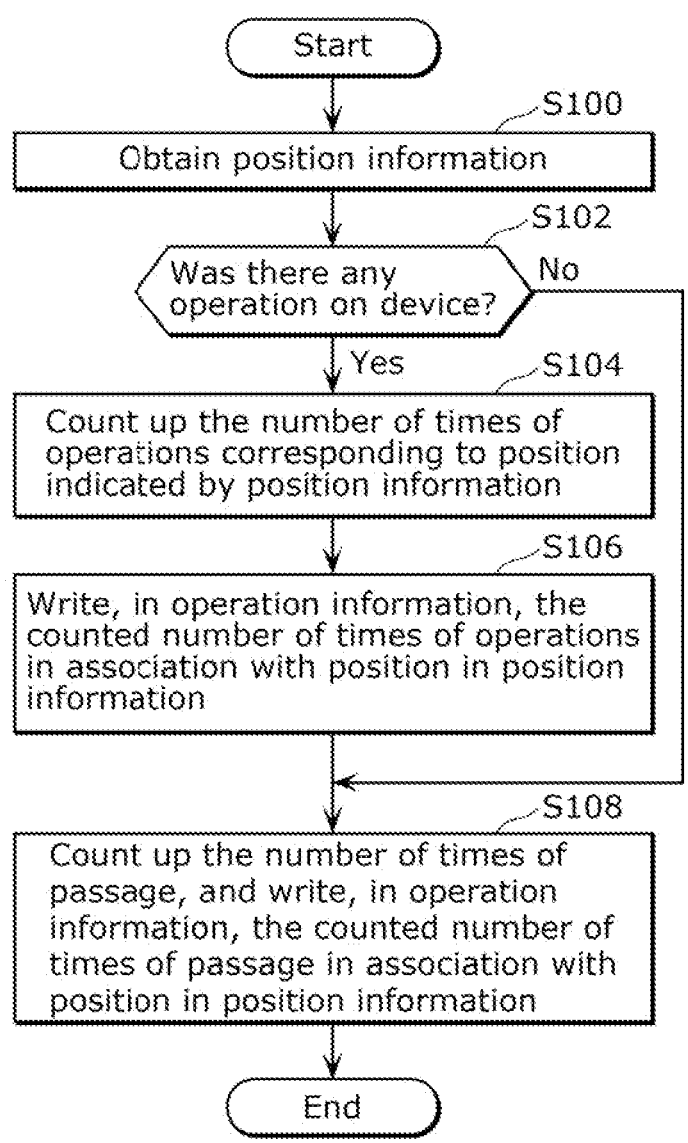
FIG. 25 is a flowchart of processing operations performed by the information storage device which creates operation information with which an operation probability can be calculated, according to the variation of the embodiment.

FIG. 25 is a flowchart of processing operations performed by an information storage device 100a which creates operation information with which an operation probability can be calculated. In FIG. 25, Steps S100 to S106 are the same as the processes of the flowchart indicated by FIG. 7, and thus the detailed descriptions thereof are not repeated.

When the number of times of operations is updated to the counted-up number of times of operations (Step S106), the measurement processing unit 130 updates the number of times of operations of the operation information (Step S108). In other words, the measurement processing unit 130 reads out the number of times of passage associated with the position of the position information d3 in the operation information, and counts up the number of times of passage. The measurement processing unit 130 updates, to the counted number of times of operations, the number of times of operations associated with the position in the operation information stored in the operation information storage unit 140 (Step S108).

In the embodiment and this variation thereof, the map information creation device 300 creates map information d2 indicating identification information for identifying whether or not information presentation is allowed. However, it is also possible to create map information d2 indicating information presentation probability instead of the identification information. The information presentation probability indicates the frequency of information presentation as the probability, and specifically indicates the ratio of the number of times of presentation at a predetermined position on the map with respect to the number of times of passage at the predetermined position. The number of times of presentation is the number of times by which presentation of the obtained presentable information d4 should be performed. In other words, on condition that the presentable information d4 is obtained when the movable body passes through the predetermined position, it is determined that the presentable information d4 is to be determined at the position when the information presentation probability associated with the position is higher than 1/(the number of times of passage) in the map information d2.

For example, when the movable body passes through the predetermined position, the information presentation probability is higher than 1/(the number of times of passage=10+1) when the information presentation probability at the position is 1/10 and the position was passed through ten times in the near past. Accordingly, in this case, it is determined that the presentable information d4 is presented at the position. On the other hand, when the position was passed through nine times in the near past, and information presentation was not performed at any of the nine times of passage, the information presentation probability is not higher than 1/(the number of times of passage=9+1). Accordingly, in this case, it is determined that the presentable information d4 is not presented at the position.

The determining unit 320 of the map information creation device 300 sets the information presentation probability at each position on the map by comparing the number of times of operations at the position indicated by the operation information d1 and the threshold value.

Figure 26:
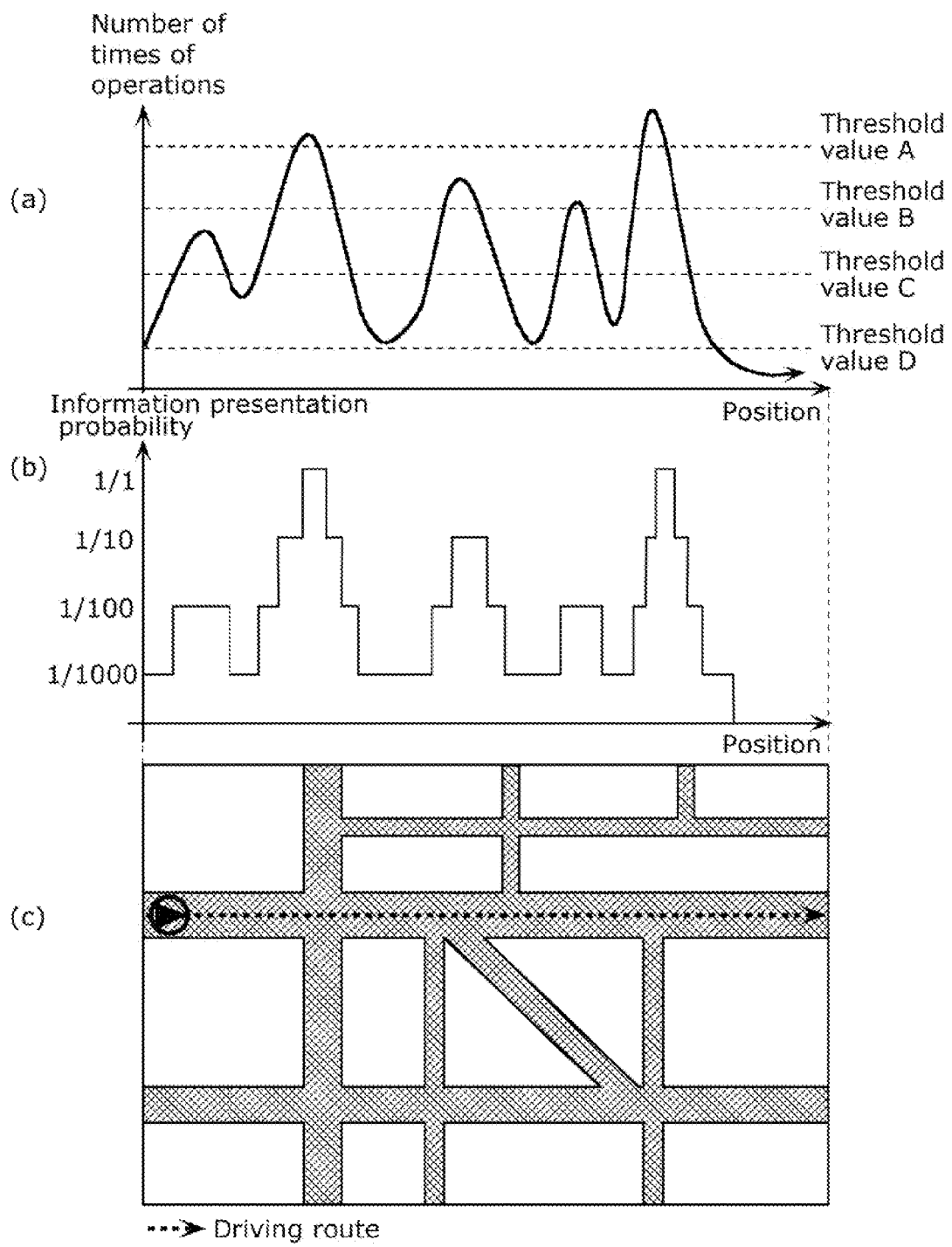
FIG. 26 is an illustration presenting a relationship between the number of times of operations, an information presentation probability, and a route on a map, according to the variation of this embodiment.

FIG. 26 is an illustration presenting a relationship between the number of times of operations, an information presentation probability, and a route on a map, according to this variation of this embodiment.

The determining unit 320 of the map information creation device 300 identifies, for each position along the route on the map shown in (c) of FIG. 26, the number of times of operations corresponding to the position from the operation information d1. Subsequently, as shown in (a) of FIG. 26, the determining unit 320 determines whether or not the number of times of operation is larger than each of a threshold value A, a threshold value B, a threshold value C, and a threshold value D. As a result, as shown in (b) of FIG. 26, the determining unit 320 sets the information presentation probability at each position to either 1/1, 1/10, 1/100, or 1/1000. Next, the creating unit 330 of the map information creation device 300 writes each information presentation probability that has been set to the map information in association with the position.

Figure 27:
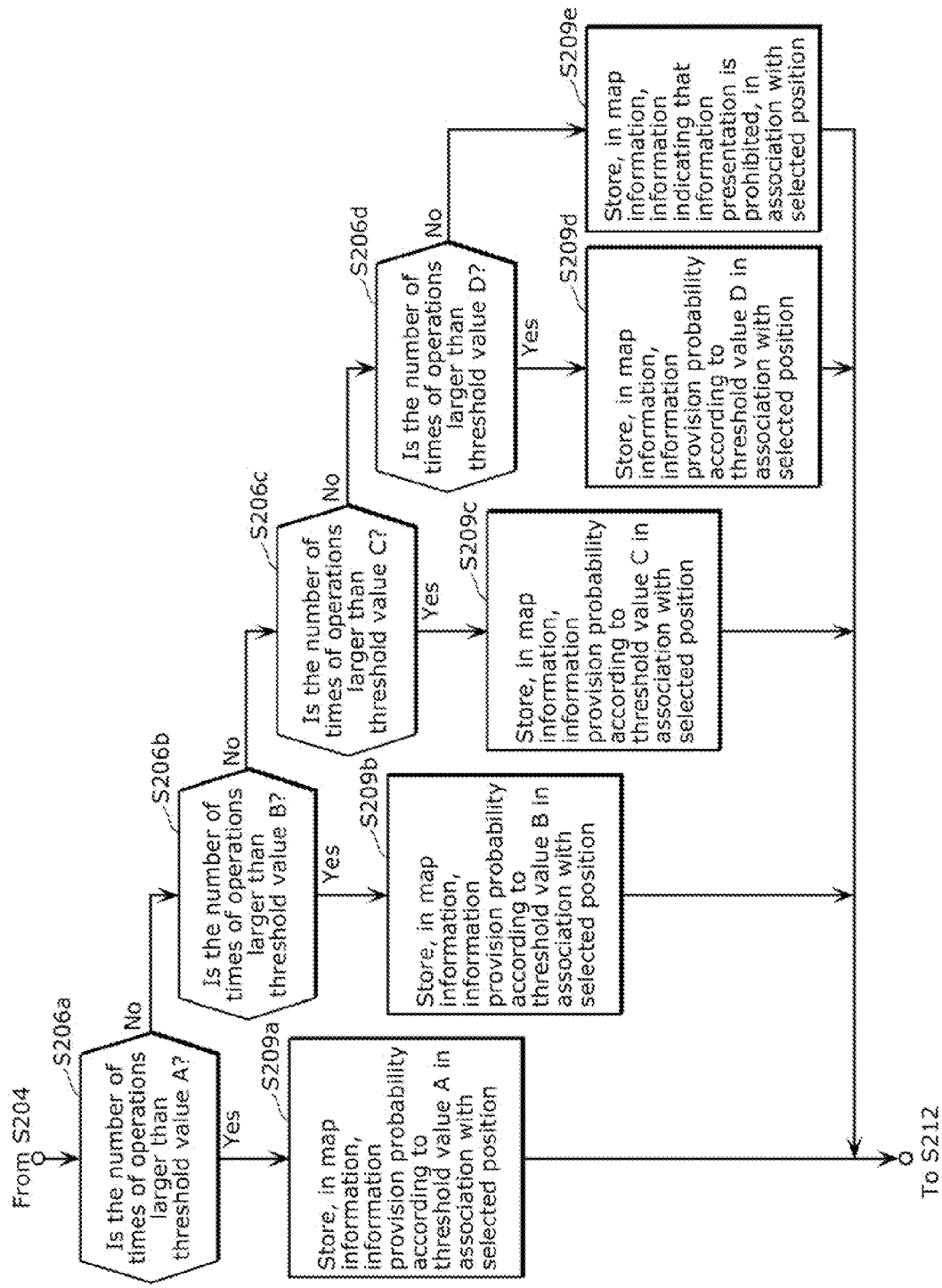
FIG. 27 is a flowchart of processing operations performed by a map information creation device according to the variation of the embodiment.

FIG. 27 is a flowchart of processing operations performed by the map information creation device 300.

The map information creation device 300 performs Steps S206a to S206d and Steps S209a to S209e instead of Steps S206, S208, and S210 shown in FIG. 12 which are performed by the map information creation device 300 in the embodiment. Accordingly, in FIG. 27, the same steps (Steps S200, S202, S204, and S212) as in the steps performed by the map information creation device 300 in the embodiment are not described again.

First, after the processing of Step S204, the determining unit 320 of the map information creation device 300 determines whether or not the number of times of operations is larger than the threshold value A (Step S206a). When the determining unit 320 determines that the number of times of operations is larger than the threshold value A (Yes in Step S206a), the information presentation probability (for example, 1/1) set according to the threshold value A is written in the map information d2 in association with the selected position (Step S209a).

On the other hand, when determining that the number of times of operations is smaller than or equal to the threshold value A (No in Step S206a), the determining unit 320 further determines whether or not the number of times of operations is larger than the threshold value B (Step S206b). Here, when the determining unit 320 determines that the number of times of operations is larger than the threshold value B (Yes in Step S206b), the creating unit 330 writes the information presentation probability (for example, 1/10) set suitable for the threshold value B to the map information d2 in association with the selected position (Step S209b).

On the other hand, when determining that the number of times of operation is smaller than or equal to the threshold value B (No in Step S206c), the determining unit 320 further determines whether or not the number of times of operations is larger than the threshold value C (Step S206c). Here, when the determining unit 320 determines that the number of times of operations is larger than the threshold value C (Yes in Step S206c), the creating unit 330 writes the information presentation probability (for example, 1/100) set suitable for the threshold value C to the map information d2 in association with the selected position (Step S209c).

On the other hand, when determining that the number of times of operation is smaller than or equal to the threshold value C, the determining unit 320 further determines whether or not the number of times of operations is larger than the threshold value D (Step S206d). Here, when the determining unit 320 determines that the number of times of operations is larger than the threshold value D (Yes in Step S206d), the creating unit 330 writes the information presentation probability (for example, 1/1000) set suitable for the threshold value D to the map information d2 in association with the selected position (Step S209d). On the other hand, when the determining unit 320 determines that the number of times of operations is smaller than or equal to the threshold value D (No in Step S206), the creating unit 330 writes the identification information "prohibited" to the map information d2 in association with the selected position (Step S209e). It is to be noted that the identification information "prohibited" corresponds to the information presentation probability indicating 0. In addition, the threshold values A to D have a relationship of the threshold value A>the threshold value B>the threshold value C>the threshold value D.

Figure 28:
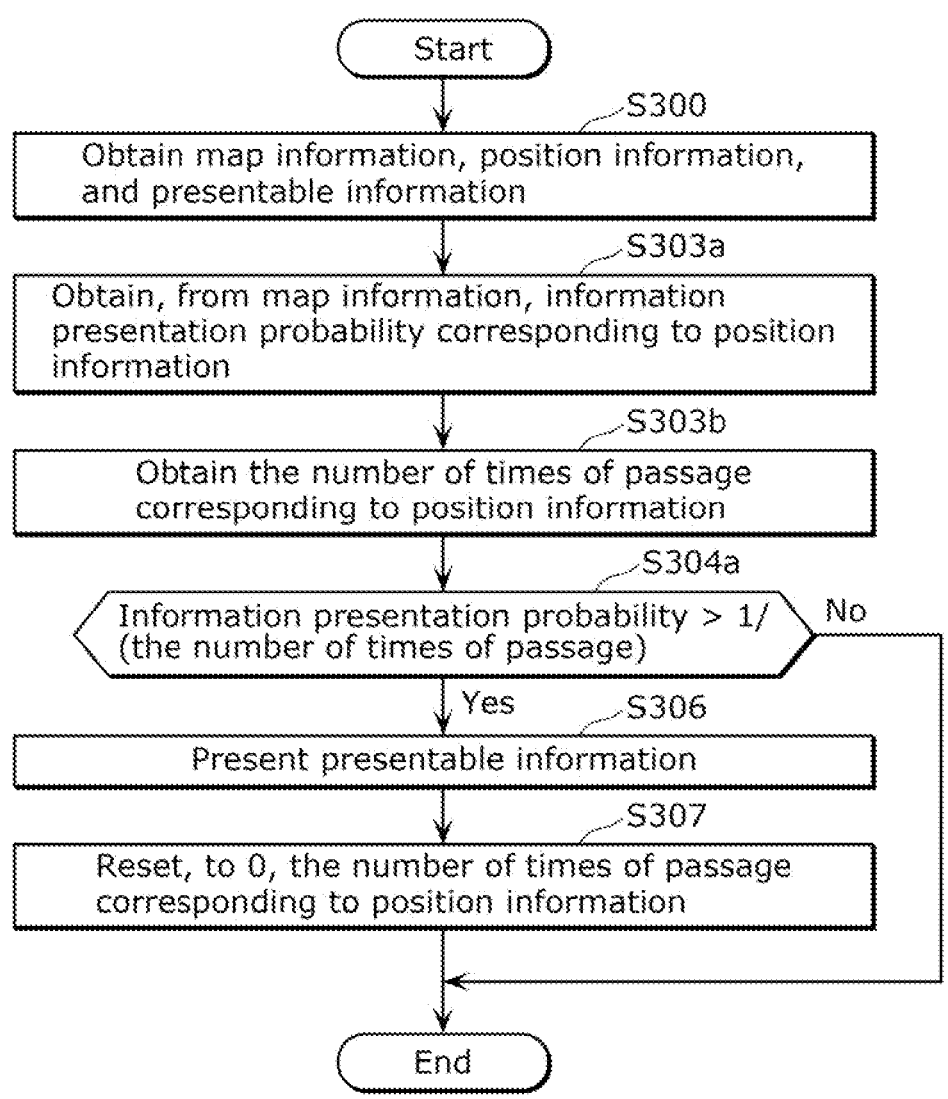
FIG. 28 is a flowchart of processing operations performed by the information presentation device using the map information according to the variation of the embodiment.

FIG. 28 is a flowchart of processing operations performed by the information presentation device 200 using the map information d2.

First, the map obtaining unit 210, the position obtaining unit 220, and the time information obtaining unit 230 obtain the map information d2, the position information d3, and the presentable information d4, respectively (Step S300). These kinds of information may be obtained at the same time or at different times. Each of the map obtaining unit 210, the position obtaining unit 220, and the information obtaining unit 230 outputs the obtained information to the filter unit 240.

When the presentable information d4 is obtained by the information obtaining unit 230, the filter unit 240 obtains, from the map information d2, the information presentation probability corresponding to a current position of the wireless terminal 1100 indicated by the latest position information d3 at that time (Step S303a). Furthermore, the filter unit 240 obtains the number of times of passage corresponding to the current position of the wireless terminal 1100 indicated by the position information d3 (Step S303b).

Next, the filter unit 240 determines whether or not the information presentation probability is higher than 1/(the number of times of passage) (Steps S304a). In other words, the filter unit 240 determines whether or not to present the obtained presentable information d4 to the user at the current position indicated by the position information d3.

Here, when the filter unit 240 determines that the information presentation probability is high, stated differently, determines to present the presentable information d4 to the user (Yes in Step S304a), the presenting unit 250 obtains the presentable information d4 from the filter unit 240, and presents the presentable information d4 to the user (Step S306). At this time, the filter unit 240 resets the number of times of passage corresponding to the current position to 0 (Step S307). On the other hand, when the filter unit 240 determines that the information presentation probability is not high, stated differently, determines not to present the presentable information d4 to the user (No in Step S304a), the filter unit 240 prohibits output of the presentable information d4 to the presenting unit 250. As a result, the presenting unit 250 does not obtain the presentable information d4 from the filter unit 240, and does not present the presentable information d4 at the current position.

In the example, the map information creation device 300 discretely sets the information presentation probabilities (1/1, 1/10, 1/100, or 1/1000) using the threshold values A to D. However, it is also possible to sequentially set information presentation probabilities in smaller pitches.

Figure 29:
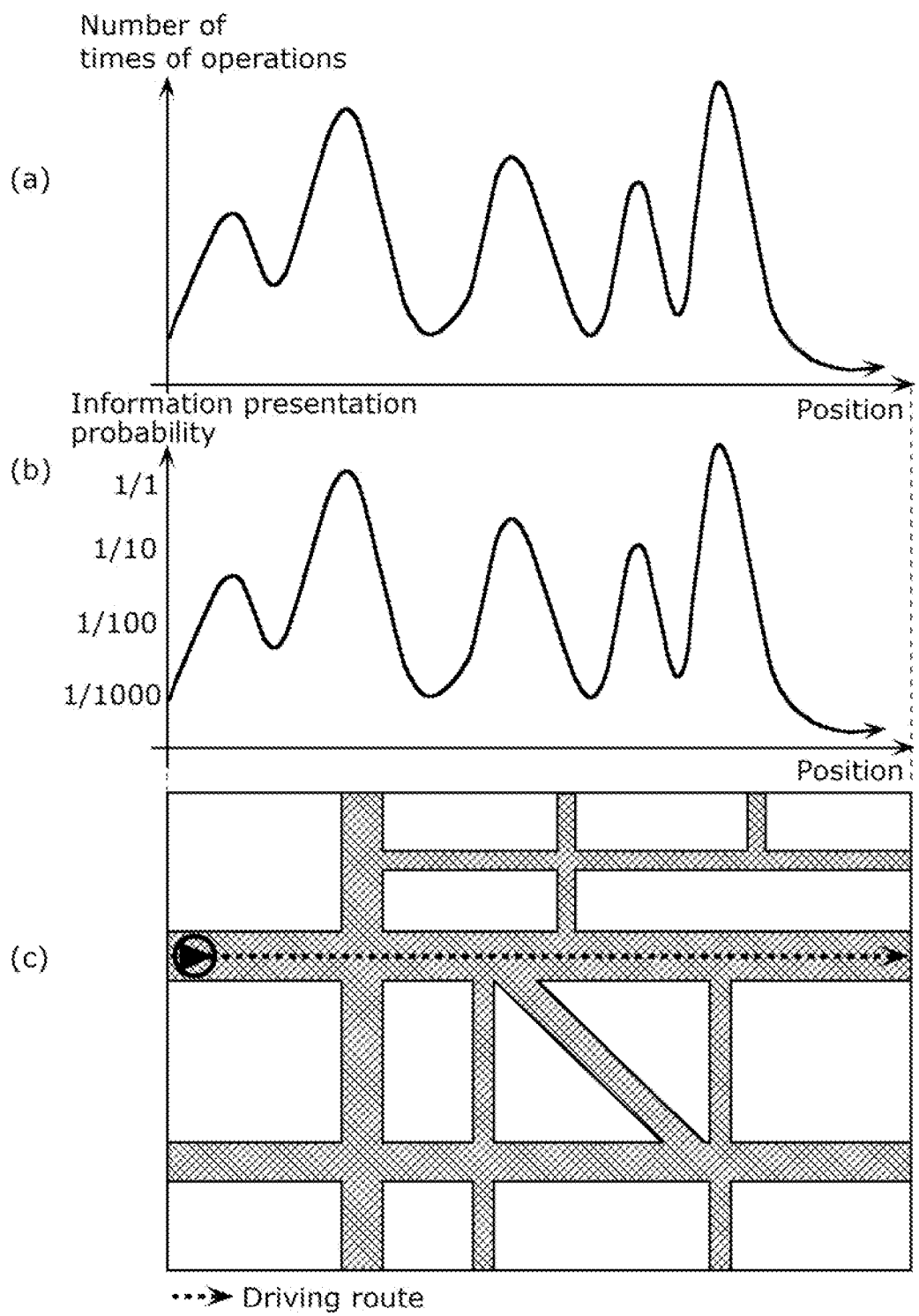
FIG. 29 is an illustration presenting a relationship between the number of times of operations, an information presentation probability, and a route on a map, according to the variation of this embodiment.

FIG. 29 is an illustration presenting another example of a relationship between the number of times of operations, an information presentation probability, and a route on a map.

The determining unit 320 of the map information creation device 300 identifies, for each position along the route on the map shown in (c) of FIG. 29, the number of times of operations corresponding to the position from the operation information. Here, as illustrated in (a) of FIG. 29, the determining unit 320 does not determine whether or not the number of times of operations is larger than a threshold value. As illustrated in (b) of FIG. 29, the determining unit 320 sets an information presentation probability associated one-to-one with the number of times of operations at the position. The information presentation probabilities are linearly associated with the numbers of times of operations. Next, the determining unit 320 of the map information creation device 300 writes each information presentation probability that has been determined to the map information in association with the position. In this way, it is possible to control the time for information presentation more precisely.

In the embodiment and the variation thereof, devices that are the targets of the operations detected by the operation detecting unit 120 are the wireless terminal 1100 and an air conditioning device such as an air conditioner, but another device is also possible. For example, the device that is the target of an operation may be the information presentation device 200. In this case, a response operation by the user to the information presented by the information presentation device 200 is detected. Operation target devices may be information devices such as a navigation device, an AV device, a mobile phone, a personal computer, a tablet, a smartphone, and a display. Detectable operations may be an operation of opening or closing a window, an operation on a device for antifog etc., an operation of switching ON/OFF a wiper, an operation on an air conditioning device, an operation of opening or closing a refrigerator, and driving-related operations using an accelerator, a brake, and a handle. In other words, the detectable operations may be any operations that may be performed when the movable body is moved.

In the embodiment and the variation thereof, the determining unit 320 of the map information creation device 300 determines whether or not the information presentation is allowed, using the predetermined threshold values. However, these threshold values may be determined in any way. For example, the determining unit 320 may determine the threshold values from the operation information d1. For example, the determining unit 320 may determine, as a threshold value, an average value of the numbers of times of operations at all of the positions, or a median value of the numbers of times of operations at all of the positions. Alternatively, the determining unit 320 may calculate a probability based on the number of times of passage at the position and the number of times of operations at the position, and determines a threshold value based on the probability. The determining unit 320 may determine a fixed value as a threshold value, or a value calculated by another way as a threshold value.

In the embodiment and the variation thereof, the determining unit 320 of the map information creation device 300 determines that information presentation is allowed when the number of times of operations is larger than the threshold value, and determines that information presentation is prohibited when the number of times of operations is smaller than or equal to the threshold value. However, when the number of times of operations indicated in the operation information d1 is the number of times of one of driving-related operations such as an accelerator operation, a brake operation and a handle operation, the determining unit 320 determines that the information presentation is prohibited when the number of times of operations is larger than the threshold value, and determines that the information presentation is allowed when the number of times of operations is smaller than or equal to the threshold value. In other words, the driving load on the user (user load) is large when the driving-related operations are many or the operations other than the driving-related operations are few. On the other hand, the driving load on the user (user load) is small when the driving-related operations are few or the operations other than the driving-related operations are many. Accordingly, the determining unit 320 determines that the information presentation is prohibited when the user load is large, and determines that the information presentation is allowed when the user load is small.

In the embodiment and the variation thereof, the movable body is either the car 1000a or the wireless terminal 1100. However, the movable body may be any one that is movable by the user. Examples include a motorcycle, a bicycle, an electric train, an air plane, a mobile phone, a tablet, and a notebook computer. In addition, the user of the movable body does not always need to move together with the movable body, and may control the movable body remotely.

In addition, in the embodiment and the variation thereof, the position information d3 is created through the processing using the GPS, but may be created using another system. The wireless terminal 1100 may obtain the position information d3 via the communication network 3000.

In addition, any of the embodiment and the variation thereof may be arbitrarily combined with any of the systems illustrated using FIGS. 22 to 29. For example, the map information creation device may create map information indicating identification information, for each of combinations of one of positions, one of traveling directions, one of time zones, one of the details of operations, one of subjects (persons) who performed the operations, etc. The information presentation device 200 of the wireless terminal 1100 may display the map information created by the map information creation device on the display in a manner as illustrated in either FIG. 10A or FIG. 10B.

In the embodiment and this variation thereof, as indicated by the flowchart of FIG. 12, the map information creation device 300 iteratively performs, for each position on the map, an operation of selecting a position on the map and writing the identification information corresponding to the position onto the map information d2. However, the map information creation device 300 may iteratively perform, for each position indicated by the operation information d1, an operation of writing the identification information corresponding to the position indicated by the operation information d1 onto the map information d2, instead of selecting each position on the map. In the embodiment and this variation thereof, the map information creation device 300 creates the map information d2 using pieces of operation information d1. However, the map information d2 may be created using only one piece of the operation information d1. When a position (unknown position) which is not indicated in any of the pieces of operation information d1 is present on the map, and it is determined that information presentation is allowed for a certain position near the unknown position, the map information creation device 300 may estimate that information presentation is also allowed for the unknown position. Alternatively, when it is determined that information presentation is allowed for a position in an environment similar to that of the unknown position in the above case, the map information creation device 300 may estimate that information presentation is also allowed for the unknown position.

In the embodiment and the variation thereof, the operation information storage unit 140 of the information storage device 100 is provided with the movable body. However, the operation information storage unit 140 is provided with the server 2000 instead of the information storage device 100. In this case, operation information d1 created by the information storage device 100 is transmitted to the server 2000, and is stored in the operation information storage unit 140 of the server 2000. In stead of the wireless terminal 1100, the information storage device 100 may be provided in the server 2000. In this case, the information storage device 100 obtains position information d3 from the wireless terminal 1100 via the communication network 3000, and detects an operation performed on a device in the car 1000a through communication via the communication network 3000. In other words, a unit which directly obtains or detects information related to the movable body and units other than the unit which presents the information does not always need to move together with the movable body, and may be provided with a computer such as the server 2000 connected via the communication network 3000.

In the embodiment and this variation thereof, the map information creation device 300 is provided with the server 2000. However, the map information creation device 300 may be provided in the wireless terminal 1100. Alternatively, only the map information storage unit 340 of the map information creation device 300 may be provided with the wireless terminal 1100.

In the embodiment and the variation thereof, at least one of the image and the sound is used to present the presentable information d4 to the user. However, any other information communication medium which makes an approach to the user may be used to present the presentable information d4. For example, the presentable information d4 may be presented using a sense of touch or a sense of smell.

In the embodiment and this variation, the map information creation device 300 includes the map information storage unit 340, but may not always include the map information storage unit 340.

It is to be noted that the embodiment and the variation thereof are described assuming that the position information and the map relate to an outdoor area, but the indoor area of a building, an apartment, or a house is also possible.

Figure 30A:
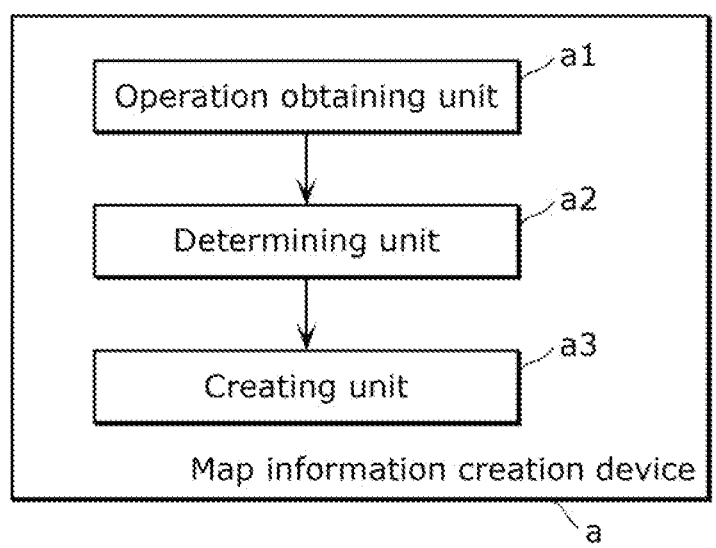
FIG. 30A is a block diagram illustrating a configuration of a map information creation device without any map information storage unit.

FIG. 30A is a block diagram illustrating a configuration of a map information creation device that does not include any map information storage unit 340.

The map information creation device a is a map information creation device which creates map information, and includes: an obtaining unit a1 which obtains operation information d1 indicating each of positions passed through by a movable body which is moved by a user and the frequency of operations on a device of the movable body performed by the user when the movable body was at the position; a determining unit a2 which determines, for each position on the map, whether or not information presentation is allowed, based on the frequency at the position indicated by the operation information; and a creating unit a3 which creates map information d2 indicating a result of the determination by the determining unit a2 for each position on the map.

Figure 30B:
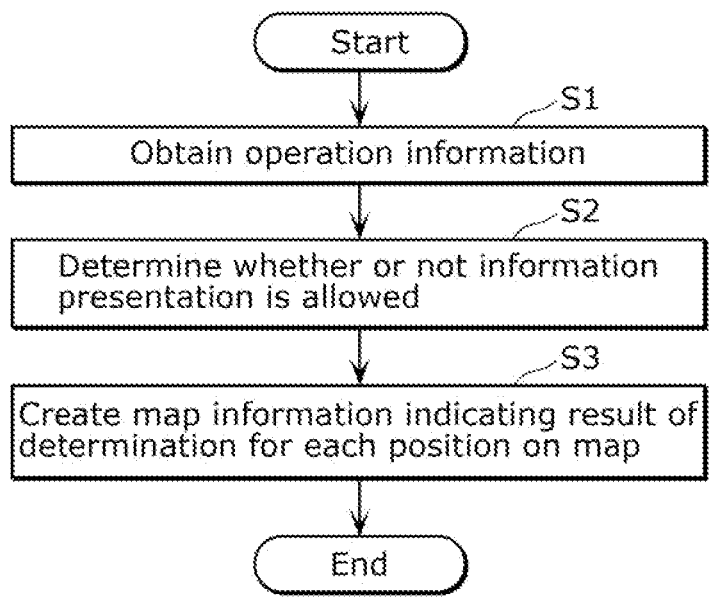
FIG. 30B is a flowchart of a map information creation method performed by the map information creation device without any map information storage unit.

FIG. 30B is a flowchart of a map information creation method performed by the map information creation device a.

The map information creation method is a map information creating method, and includes: an operation obtaining step S1 of obtaining operation information d1 indicating each of positions passed through by a movable body which is moved by a user and the frequency of operations on a device of the movable body performed by a user when the movable body was at the position; a determining step S2 of determining, for each position on the map, whether or not information presentation is allowed, based on the frequency at the position indicated by the operation information d1; and a creating step S3 of creating map information d2 indicating a result of the determination by the determining step for each position on the map.

It is to be noted that each of the constituent elements in the embodiment and the variation thereof may be configured in the form of an exclusive hardware product, or may be implemented by executing a software program suitable for the constituent element. Each of the constituent elements may be implemented by means of a program executing unit, such as a CPU and a processor, reading and executing the software program recorded on a recording medium such as a hard disk or a semiconductor memory. Here, the software which implements the map information creation device in the embodiment and the variation thereof may be a program causing a computer to execute the map information creation method including the above-described Steps S1 to S3. The software which implements the information presentation device in the embodiment and the variation thereof may be a program causing a computer to execute the information presentation method including the respective steps below. The information presentation method is an information presentation method for presenting information and includes: obtaining map information indicating a load of the user as a user load required for the user to cause the movable body to pass through each position on a route along which the movable body can be moved on a map; obtaining position information indicating a position of the movable body; identifying the user load at the position indicated by the position information obtained with reference to the map information, and deciding whether or not to present the presentable information obtained, based on the identified user load; and presenting the presentable information when it is decided in the deciding that the presentable information is presented.

In addition, in the embodiment and the variation thereof, the information presentation device 200 is included in the wireless terminal 1100. However, the information presentation device 200 may be included in the server 2000, in stead of the wireless terminal 1100. In this case, the server 2000 determines whether or not to present presentable information to the user, with reference to a database storing map information created by the map information creation device 300. When the server 2000 determines to present the presentable information to the user, the server 2000 provides the movable body that is either the car 1000 or the wireless terminal 1100 with the presentable information.

In other words, the server 2000 provides the movable body with the presentable information according to the information provision method below. The information provision method is an information provision method for providing, to a movable body, presentable information to a user of the movable body using wireless communication via a communication network, the information provision method and includes: obtaining position information indicating a position of the movable body; obtaining presentable information; identifying a user load at a position indicated by the position information obtained with reference to a database storing map information indicating a load of a user as a user load required for the user to cause the movable body to pass through each of positions on a route on a map along which the movable body can be moved, and deciding whether or not the presentable information obtained is presented to the user, based on the user load identified; and providing the presentable information to the movable body via the communication network when it is decided in the deciding that the presentable information is presented to the user.

In addition, any of the embodiment and the variation thereof can be applied to the information provision system which provides a service indicated below.

(Entire Configuration of Service Provided)

(A) in FIG. 31 is an illustration of an entire configuration of an information provision system applicable to the embodiment and the variation thereof.

A group ex100 is, for example, a company, a community, a home or the like of any size. The group ex100 includes a plurality of devices ex101, namely a device A and a device B, and a gateway ex102. The devices ex101 may include a device connectable to the Internet (a smartphone, a PC, a TV, or the like) and a device unconnectable to the Internet by itself (a lighting fixture, a washing machine, a refrigerator, a car navigation device, or the like). A device that is unconnectable to the Internet by itself but is connectable to the Internet via the gateway ex102 may be included. Furthermore, the group ex100 includes users ex10 who use the devices ex101. It is to be noted that the group ex100 corresponds to any one of cars 1000a to 1000c in the embodiment and the variation thereof.

The data center operation company ex110 has a cloud server ex111. The cloud server ex111 is a virtual server which links with a variety of devices via the Internet. The data center operation company ex110 manages a huge amount of data (big data) etc. which are difficult to deal with by a general database management tool or the like. The data center operation company ex110 manages data and the cloud server ex111, and operates the data center which performs the management. The services provided by the data center operation company ex110 will be described in detail later. Here, the data center operation company ex110 is not limited to a company which only performs management of the data and operation of the cloud server ex111. For example, when a device manufacturer which develops and manufactures one of the devices ex101 also performs management etc. of data and the cloud server ex111, the device manufacturer corresponds to the data center operation company ex110 ((B) in FIG. 31). Furthermore, the data center operation company ex110 is not limited to one company. For example, when the device manufacturer manages data and operates the cloud server ex111 in collaboration or by sharing with a device manufacturer and an other management company, both or one of them corresponds to the data center operation company ex110 ((C) in FIG. 31).

The service provider ex120 has a server ex121. The server ex121 here can be of any size and includes a memory in a PC for individual use, for example. A service provider in another case may not have a server ex121.

It is to be noted that the gateway ex102 is not mandatory in the above service. For example, when the cloud server ex111 manages all the data, the gateway ex102 is not required. Furthermore, there are cases where the devices unconnectable to the Internet by themselves do not exist at home, such as when all the devices are connected to the Internet. Here, at least one of the cloud server ex111 and the server ex121 corresponds to the server 2000 in the above-described embodiment and the variation thereof.

Next, a flow of information in the service is described.

First, the device A or the device B in the group ex100 transmits each of log information items to the cloud server ex111 in the data center operation company ex110. The cloud server ex111 stores the log information items of the device A or the device B ((a) in FIG. 31). Here, each log information item indicates, for example, an operation status and an operation date and time of a corresponding one of the devices 101. Non-limiting examples of the log information items include a viewing history of a TV, video timer recording information of a recorder, the operation date and time of a washing machine, the amount of laundry, the date and time or the number of times of opening and closing a refrigerator. All information items obtainable from any devices can be referred to as log information items. There are cases where log information items are directly provided to the cloud server ex111 from the devices ex101 themselves via the Internet. Furthermore, the log information items may be temporarily stored to the gateway ex102 from the devices ex101, and then are provided to the cloud server ex111 from the gateway ex102.

Next, the cloud server ex111 in the data center operation company ex110 provides, in constant units, the stored log information items to the service provider ex120. Here, the unit may be a unit by which the information items stored by the data center operation company can be organized and provided to the service provider ex120, or in a unit which is requested by the service provider ex120. Although the unit does not always need to be constant, and the amount of information to be provided may change according to the situation in some cases. The log information items are stored in the server ex121 of the service provider ex120, as necessary ((b) in FIG. 31). The service provider ex120 organizes the log information items suitably for the service to be provided to the user, and provides the suitable information to the user. The user to be provided with the information may be the user ex10 who uses the devices ex101 or an external user ex20. The service provision method may provide information directly to the user from the service provider ((b) and (e) in FIG. 31), for example. Furthermore, according to the service provision method, the information may be provided to the user, for example, via the cloud server ex111 in the data center operation company ex110 again ((c) and (d) in FIG. 31). Furthermore, the cloud server ex111 in the data center operation company ex110 may organize the log information items suitably for the service to be provided to the user, and may provide them to the service provider ex120.

It is to be noted that the users ex10 and the users ex20 may be either different or the same.

The technique in the above-described embodiment and the variation thereof may be implemented in, for example, the following types of cloud services. It should be noted that implementation of the technique described in the above embodiment and the variation thereof is not limited to these types.

(Service Type 1: Own Data Center Type)

FIG. 32 is a diagram illustrating a service type 1 (own data center type). In this type, a service provider ex120 obtains information from a group ex100 and provides a service to users. The service provider ex120 in this type serves as a data center operation company. In other words, the service provider owns a cloud server ex111 for managing big data. Thus, there is no company exclusive for data management.

In this type, the service provider ex120 operates and manages a data center (cloud server ex111) (ex203). Furthermore, the service provider ex120 manages an OS (ex202) and applications (ex201). The service provider ex120 provides a service (ex204) using the OS (ex202) and the applications (ex201) managed by the service provider ex120.

(Service Type 2: IaaS-Based Type)

Figure 33:
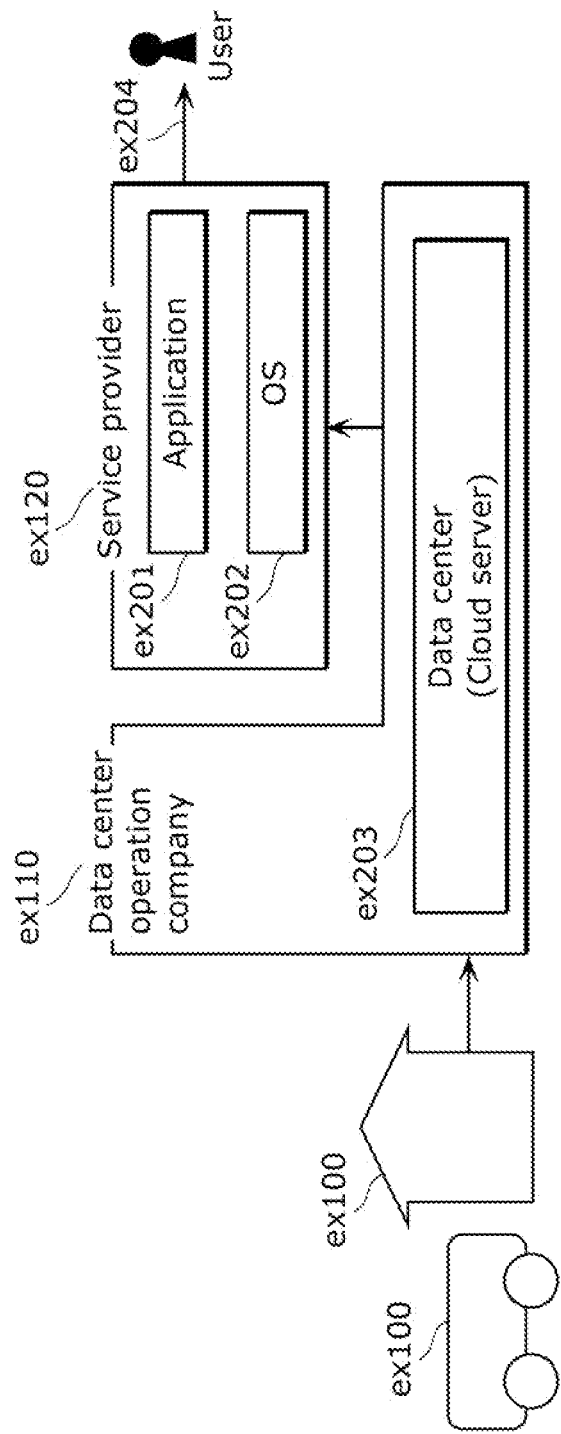
FIG. 33 is an illustration of a service type 2 (IaaS-based type) applicable to the embodiment and the variation thereof.

FIG. 33 is a diagram illustrating a service type 2 (IaaS-based type). Here, IaaS is an acronym for an Infrastructure as a Service, and refers to a cloud service providing model in which an infrastructure for building and running a computer system is provided as a service via the Internet.

In this type, a data center operation company operates and manages a data center (cloud server ex111) (ex203). Furthermore, the service provider ex120 manages an OS (ex202) and applications (ex201). The service provider ex120 provides a service (ex204) using the OS (ex202) and the applications (ex201) managed by the service provider ex120.

(Service Type 3: PaaS-Based Type)

Figure 34:
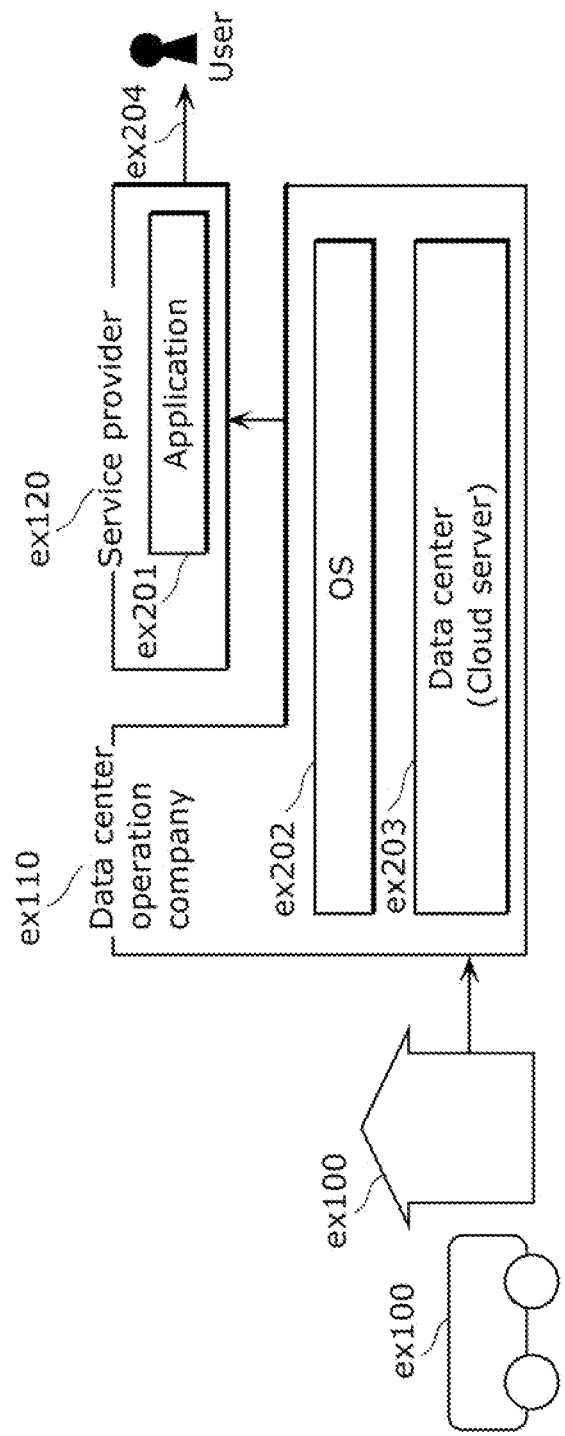
FIG. 34 is an illustration of a service type 3 (PaaS-based type) applicable to the embodiment and the variation thereof.

FIG. 34 is a diagram illustrating a service type 3 (PaaS-based type). Here, PaaS is an acronym for a Platform as a Service, and refers to a cloud service in which a platform for composing and running software is provided as a service via the Internet.

In this type, a data center operation company ex110 manages the OS (ex202), and operates and manages a data center (cloud server ex111) (ex203). Furthermore, the service provider ex120 manages the applications (ex201). The service provider ex120 provides a service (ex204) using the OS (ex202) managed by the data center operation company and the applications (ex201) managed by the service provider ex120.

(Service Type 4: SaaS-Based Type)

FIG. 35 is a diagram illustrating a service type 4 (SaaS-based type). Here, SaaS is an acronym for Software as a Service. For example, SaaS refers to a cloud service in which a company or a person (user) which does not have a data center (cloud server) is authorized to access an application provided by a platform provider having a data center (cloud server) via a network such as the Internet.

In this type, a data center operation company ex110 manages the applications (es201) and the OS (ex202), and operates and manages the data center (cloud server ex111) (ex203). The service provider ex120 provides a service (ex204) using the OS (ex202) and the applications (ex201) managed by the data center operation company ex110.

In any of these types, it is assumed that the service provider ex120 provides the service. For example, the service provider or the data center operation company may develop an OS, applications, a big data database, etc. by itself or may outsource the development to a third party.

Although the present invention has been described based on each of the above non-limiting embodiment and the variation thereof, it is to be noted that the present invention is not limited to the embodiment etc. The cases as described below are also included in the present invention.

(1) Each of the above-described devices is, specifically, a computer system including a microprocessor, a ROM, a RAM, a hard disk unit, a display unit, and so on. A computer program is stored in the RAM or the hard disk unit. The respective devices achieve their functions through the microprocessor's operations according to the computer program. Here, the computer program is configured by combining plural instruction codes indicating instructions for the computer.

(2) A part or all of the constituent elements of the respective devices may be configured with a single system-LSI (Large-Scale Integration). The system-LSI is a super-multi-function LSI manufactured by integrating constituent units on a single chip, and is specifically a computer system configured to include a microprocessor, a ROM, a RAM, and so on. A computer program is stored in the RAM. The system-LSI achieves its function through the microprocessor's operations according to the computer program.

(3) A part or all of the constituent elements constituting the respective devices may be configured as an IC card which can be attached to and detached from the respective devices or as a stand-alone module. The IC card or the module is a computer system configured from a microprocessor, a ROM, a RAM, and so on. The IC card or the module may also be included in the above-described super-multi-function LSI. The IC card or the module achieves its functions through the microprocessor's operations according to the computer program. The IC card or the module may also be implemented to be tamper-resistant.

(4) The present invention may be implemented as the method as described above. Alternatively, the present invention may be implemented as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray (registered trademark) Disc), and a semiconductor memory. Furthermore, the present invention may also be implemented as the digital signals recorded on these recording media.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the above-described computer program and the microprocessor operates according to the computer program.

Furthermore, it is also possible to execute another independent computer system by transmitting the programs or the digital signals recorded on the above-described recording media, or by transmitting the programs or digital signals via the above-described network and the like.

(5) Any combination of the embodiment and the variation thereof is possible.

INDUSTRIAL APPLICABILITY

The present invention provides an advantageous effect of being able to provide information at a right time, and is applicable to, for example, car navigation devices, mobile phones, tablet terminals, personal computers, servers, etc.

REFERENCE SIGNS LIST

11 Operation unit
12 Terminal processing unit
13 Terminal communication unit
14 Display
15 Speaker
21 Server communication unit
22 Server processing unit
100, 100a Information storage device
110 Position obtaining unit
111 Direction obtaining unit
112 Time obtaining unit
120 Operation detecting unit
130, 130a Measurement processing unit
140 Operation information storage unit
200, 200a Information presentation device
210 Map obtaining unit
220 Position obtaining unit
221 Direction obtaining unit
222 Time obtaining unit
230 Information obtaining unit
240, 240a Filter unit
250 Presenting unit
300 Map information creation device
310 Operation obtaining unit
320 Determining unit
330 Creating unit
340 Map information storage unit
1000 Car
2000 Server
3000 Communication network
1100 Wireless terminal
A Map information creation device
a1 Operation obtaining unit
a2 Determining unit
a3 Creating unit d1, d11, d21, d31 Operation information
d2, d12 Map information
d3 Position information
d4 Presentable information
d5 Direction information
d6 Time information

The invention claimed is:

1. A map information creation device which creates map information and is provided in a server, the server performing wireless communication with a movable body via a communication network, the server and the movable body being included in a system, the map information creation device comprising:
a processor; and
a non-transitory memory having stored thereon executable instructions, which when executed, cause the processor to perform:
obtaining, from the movable body via the communication network, operation information indicating (i) frequency of an operation performed by a user of the movable body on a device related to predetermined information and (ii) a position of the movable body at a time of the operation performed on the device, the operation being performed in response to provision of the predetermined information to the user of the movable body, the predetermined information being information on an inquiry to the user of the movable body;
comparing, for each of positions on a map, a magnitude relationship between the frequency indicated by the operation information and a predetermined threshold value, based on the obtained operation information, determining that a current position is a position at which information can be presented to the user of the movable body when the frequency is higher than the threshold value, and determining that a current position is a position at which information cannot be presented to the user of the movable body when the frequency is not higher than the threshold value;
creating the map information indicating a result of the determination for each position on the map; and
outputting the created map information to the movable body, the movable body presenting information to the user of the movable body using the created map information.

2. The map information creation device according to claim 1,
wherein the operation information indicates the frequency of the operation performed on the device by the user in each of combinations of one of the positions passed through by the movable body and one of moving directions of the movable body after passing through the position, and
the executable instructions, when executed, cause the processor to further perform:
determining, for each of the combinations of the positions on the map and the directions, whether or not information can be presented, based on the frequency corresponding to the combination, the combination being indicated by the operation information; and
creating the map information indicating the result of the determination for each of the combinations of the positions on the map and the directions.

3. The map information creation device according to claim 1,
wherein the operation information indicates the frequency of the operation performed on the device by the user in each of combinations of one of the positions passed through by the movable body and one of time zones each including a time when the movable body passed through the position, and
the executable instructions, when executed, cause the processor to further perform:
determining, for each of the combinations of the positions on the map and the time zones, whether or not information can be presented, based on the frequency corresponding to the combination, the combination being indicated by the operation information; and
creating the map information indicating the result of the determination for each of the combinations of the positions on the map and the time zones.

4. The map information creation device according to claim 1,
wherein the operation information indicates the frequency of the operation performed on the device by the user in each of situations indicated by combinations of one of the positions passed through by the movable body, one of moving directions of the movable body after passing through the position, and one of time zones each including a time when the movable body passed through the position, and
the executable instructions, when executed, cause the processor to further perform:
determining, for each of the combinations of the positions on the map and the directions, whether or not information can be presented, based on the frequency corresponding to the combination, the combination being indicated by the operation information; and
creating the map information indicating the result of the determination for each of the combinations of the positions on the map and the directions.

5. The map information creation device according to claim 1,
wherein the operation information indicates, for each position passed through by the movable body, the position, the operation performed on the device by the user when the movable body was at the position, and a frequency of the operation, and
the executable instructions, when executed, cause the processor to further perform determining, for each position on the map, whether or not information can be presented, based on the operation at the position and the frequency of the operation both indicated by the operation information.

6. The map information creation device according to claim 5,
wherein the information presentation is determined to be prohibited at the position indicated by the operation information among the positions when the frequency at the position indicated by the operation information is higher than the threshold value and the operation at the position is an operation that prohibits the information presentation.

7. An information presentation device which presents information in a movable body, the device comprising:
a processor; and
a non-transitory memory having stored thereon executable instructions, which when executed, cause the processor to perform:

obtaining, from a map information creating device via a communication network, map information indicating, in an associated manner, (i) a frequency of an operation performed by a user of the movable body on a device related to predetermined information and (ii) a location on a map of the movable body at a time of the operation performed on the device, the operation being performed in response to provision of the predetermined information to the user of the movable body, the predetermined information being information on an inquiry to the user of the movable body;

obtaining position information indicating a position of the movable body;

identifying, based on the map information, the frequency at the location on the map indicated by the position information of the movable body, and determining whether or not the identified frequency is higher than a predetermined threshold value; and presenting information to the user of the movable body by causing output of the information when the identified frequency is determined to be higher than the threshold value.

8. The information presentation device according to claim 7, wherein the executable instructions, when executed, cause the processor to further perform:

obtaining direction information indicating a direction in which the movable body moves;

obtaining time information indicating a current time, obtaining the map information for identifying, for each of combinations of one of positions on a route, one of directions on the route, and one of time zones, whether or not information can be presented;

identifying with reference to the map information, the identification information which is associated with a combination of the position indicated by the position information obtained, the direction indicated by the direction information obtained, and the time zone including the time indicated by the time information obtained; and when the identification information identifies that the information can be presented, presenting the information to the user of the movable body.

9. A map information creation method for creating map information in a system including a movable body and a server, the server performing wireless communication with the movable body via a communication network, the map information creation method comprising:

obtaining, from the movable body via the communication network, operation information indicating (i) a frequency of an operation performed by a user of the movable body on a device related to predetermined information and (ii) a position of the movable body at a time of the operation performed on the device, the operation being performed in response to provision of the predetermined information to the user of the movable body, the predetermined information being information on an inquiry to the user of the movable body;

comparing, for each of positions on a map, a magnitude relationship between the frequency indicated by the operation information and a predetermined threshold value, based on the obtained operation information, determining that a current position is a position at which information can be presented to the user of the movable body when the frequency is higher than the threshold value, and determining that a current position is a position at which information cannot be presented to the user of the movable body when the frequency is not higher than the threshold value;

creating the map information indicating a result of the determination for each position on the map; and outputting the created map information to the movable body, the movable body presenting information to the user of the movable body using the created map information.

10. An information provision method for providing, to a movable body, information to be presented to a user of the movable body, in a system including the movable body and a server which performs wireless communication with the movable body via a communication network, the information provision method comprising:

obtaining, from the movable body via the communication network, operation information indicating (i) a frequency of an operation performed by a user of the movable body on a device related to predetermined information and (ii) position information indicating a position of the movable body at a time of the operation performed on the device, the operation being performed in response to provision of the predetermined information to the user of the movable body, the predetermined information being information on an inquiry to the user of the movable body;

updating, based on the operation information, a map database storing, in an associated manner, (i) a location on a map of the movable body at the position of the movable body at a time of the operation performed on the device and (ii) the frequency of the operation performed on the device by the user of the movable body in response to the provision of the predetermined information;

identifying, based on the updated map database, the frequency at the location on the map indicated by the position information of the movable body, and determining whether or not the identified frequency is higher than a predetermined threshold value; and providing the information to the movable body via the communication network when the identified frequency is determined to be higher than the threshold value, the movable body presenting the information to the user of the movable body.

11. The information provision method according to claim 10, wherein the information is generated by a server processing unit included in the server.

* * * * *